(12) United States Patent
Traynor et al.

(10) Patent No.: US 10,764,043 B2
(45) Date of Patent: Sep. 1, 2020

(54) IDENTITY AND CONTENT AUTHENTICATION FOR PHONE CALLS

(71) Applicant: University of Florida Research Foundation, Incorporated, Gainesville, FL (US)

(72) Inventors: Patrick G. Traynor, Gainesville, FL (US); Bradley G. Reaves, Raleigh, NC (US); Logan E. Blue, Gainesville, FL (US); Luis Vargas, Gainesville, FL (US); Hadi Abdullah, Gainesville, FL (US); Thomas Shrimpton, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 172 days.

(21) Appl. No.: 15/941,311

(22) Filed: Mar. 30, 2018

(65) Prior Publication Data
US 2018/0294959 A1    Oct. 11, 2018

Related U.S. Application Data

(60) Provisional application No. 62/481,951, filed on Apr. 5, 2017.

(51) Int. Cl.
*H04K 1/00*     (2006.01)
*H04L 9/08*     (2006.01)
(Continued)

(52) U.S. Cl.
CPC .......... *H04L 9/0844* (2013.01); *H04L 9/3263* (2013.01); *H04L 9/3268* (2013.01);
(Continued)

(58) Field of Classification Search
CPC ... H04L 9/0844; H04L 9/3263; H04L 9/3268; H04L 65/1076; H04L 9/3242;
(Continued)

(56) References Cited

U.S. PATENT DOCUMENTS 6,529,602 B1 * 3/2003 Walker ..................... H04K 1/00
                                                                       379/67.1
9,277,049 B1 * 3/2016 Danis ................ H04M 3/42042
(Continued)

OTHER PUBLICATIONS

Bokharaei, H. K. et al., *You Can SPIT, But You Can't Hide: Spammer Identification in Telephony Networks*, IEEE INFOCOM (2011) 41-45.

(Continued)

*Primary Examiner* — John B King
*Assistant Examiner* — Darshan I Dhruv
(74) *Attorney, Agent, or Firm* — Alston & Bird LLP

(57) ABSTRACT

Systems and methods for call authentication are provided. A method can include an enrollment protocol that ensures users control the number they claim to own, a handshake protocol that mutually authenticates the calling parties, and a call integrity protocol that ensures the security of the voice channel and the content it carries. A server can act as either an endpoint or intermediary between user clients and client-server architecture can be employed. All protocols can include end-to-end cryptography and the enrollment protocol can issue a certificate that binds the identity of the client to a phone number.

19 Claims, 7 Drawing Sheets

(51) Int. Cl.
H04L 9/32 (2006.01)
H04W 12/04 (2009.01)
H04L 29/06 (2006.01)
H04W 12/06 (2009.01)
H04W 12/00 (2009.01)
H04W 12/10 (2009.01)

(52) U.S. Cl.
CPC ......... H04L 65/1076 (2013.01); H04W 12/04 (2013.01); H04W 12/06 (2013.01); H04L 9/3242 (2013.01); H04L 63/0823 (2013.01); H04L 2209/80 (2013.01); H04W 12/00409 (2019.01); H04W 12/1006 (2019.01)

(58) Field of Classification Search
CPC ........... H04L 63/0823; H04L 2209/80; H04W 12/04; H04W 12/06; H04W 12/1006; H04W 12/00409
See application file for complete search history.

(56) References Cited

U.S. PATENT DOCUMENTS

| | | | |
|---|---|---|---|
| 2002/0152380 A1* | 10/2002 | O'Shea | H04L 9/3247 713/170 |
| 2003/0056114 A1* | 3/2003 | Goland | H04L 63/04 726/5 |
| 2007/0157026 A1* | 7/2007 | Zimmermann | H04L 9/0844 713/171 |
| 2008/0133761 A1* | 6/2008 | Polk | H04L 63/0428 709/228 |
| 2009/0217039 A1* | 8/2009 | Kurapati | H04L 63/126 713/168 |
| 2010/0150138 A1* | 6/2010 | Bjorsell | H04L 63/306 370/352 |
| 2012/0213082 A1* | 8/2012 | Carney | H04L 63/1466 370/241 |
| 2013/0111211 A1* | 5/2013 | Winslow | H04L 9/3234 713/171 |
| 2015/0124945 A1* | 5/2015 | Kurapati | H04L 63/126 379/88.02 |
| 2015/0236857 A1* | 8/2015 | Feltham | H04L 63/0414 380/270 |
| 2016/0014076 A1* | 1/2016 | Hansen | H04L 63/02 726/11 |
| 2016/0014084 A1* | 1/2016 | Hansen | H04L 63/0245 726/11 |
| 2016/0134621 A1* | 5/2016 | Palanigounder | H04W 12/06 713/156 |
| 2017/0063834 A1* | 3/2017 | Gryb | H04L 63/083 |
| 2017/0264443 A1* | 9/2017 | Tu | H04L 9/3247 |
| 2018/0041638 A1* | 2/2018 | Gupta | H04L 67/02 |
| 2018/0324187 A1* | 11/2018 | Heintel | H04L 67/1042 |

OTHER PUBLICATIONS

Bresciani, R., *The ZRTP Protocol Analysis on the Diffie-Hellman Mode*, Computer Science Department Technical Report, Foundations and Methods Research Group, Trinity College Dublin (Jun. 12, 2009) 21 pages.
Chow, S. T. et al., *Authenticating Displayed Names in Telephony*, Bell Labs Technical Journal 14(1) (2009) 267-282.
Ellison, C. et al., *Ten Risks of PKI: What You're Not Being Told About Public Key Infrastructure*, Computer Security Journal, vol. XVI (Nov. 1, 2000) 8 pages.
Hicsonmez, S. et al., *Audio Codec Identification Through Payload Sampling*, Information Forensics and Security (WIFS), 2011 IEEE International Workshop (2011) 1-6.
Huang, L. et al., *Adversarial Machine Learning*, In Proceedings of 4th ACM Workshop on Artificial Intelligence and Security (Oct. 2011) 43-58.
Jiao, Y. et al., *Robust Speech Hashing for Content Authentication*, IEEE Signal Processing Letters, vol. 16, No. 9 (Sep. 2009) 818-821.
Krawczyk, H. et al., *HMAC-Based Extract-and-Expand Key Derivation Function (HKDF)*, RFC 5869 (May 2010) 15 pages.
Lepinski, M. et al., *Additional Diffie-Hellman Groups for Use With IETF Standards*, RFC 5114 (Jan. 2008) 24 pages.
Mustafa, H. et al., *You Can Call But You Can't Hide: Detecting Caller ID Spoofing Attacks*, 44th Annual IEEE/IFIP International Conference on Dependable Systems and Networks (2014) 168-179.
Pemble, M., *Crying 'Havoc', Crying 'Wolf' or Just Howling At the Moon?*, Network Security, 2001(9) (2001) 14-16.
Phithakkitnukoon, S. et al., *Defense Against SPIT Using Community Signals*, ISI 2009 (Jun. 2009) 232.
Prevelakis, V. et al., *The Athens Affair* [online] [retrieved Oct. 25, 2018]. Retrieved from the Internet: <https://spectrum.ieee.org/telecom/security/the-athens-affair>. (Jun. 29, 2007) 12 pages.
Sengar, H., *VoIP Fraud: Identifying a wolf in Sheep's Clothing*, In Proceedings of the 2014 ACM SIGSAC Conference on Computer and Communications Security ACM, (2014) 334-345.
Traynor, P. et al., *Security for Telecommunications Networks*, Springer (2008) 177 pages.
Wang, X. et al., *VoIP: Vulnerabilities, Exploits, and Defenses*, Advances in Computers, vol. 81 (2011) 49 pages.
Whitten, A. et al., *Why Johnny Can't Encrypt: A Usability Evaluation of PGP 5.0*, In Proceedings of the 8th USENIX Security Symposium (Aug. 1999) 15 pages.
Zimmerman, P. et al., *ZTRP: Media Path Key Agreement for Unicast Secure RTP*, RFC 6189 (Apr. 2011), 116 pages.
3rd Generation Partnership Project; Technical Specification Group Radio Access Network; Typical Examples of RABs and RBs Supported by UTRA, Technical Report, TSG-RAN Meeting #17, Biarritz, France (Sep. 2002) 11 pages.
3rd Generation Partnership Project; Technical Specification Group Radio Access Network; Evolved Universal Terrestrial Radio Access (E-UTRA); NB-IOT; Technical Report for Bs and Ue Radio Transmission and Reception, 3GPP TR 36.802 V13.0.0 (Jun. 2016) 59 pages.
Let's Encrypt [online] [retrieved Oct. 25, 2018]. Retrieved from the Internet: <htttps://web.archive.org/web/20160930195059/https://letsencryptvorg/>. (dated Sep. 30, 2016) 3 pages.
Speaker Recognition—Part 1, Biometric Technology Today (Feb. 2001) 10-11.
STU-III, Secure Telephone Unit, 3rd Generation [online] [retrieved Oct. 25, 2018]. Retrieved from the Internet: <https://web.archive.org/web20160810150457/http://cryptomuseum.com/crypto/usa/stu3/index.htm>. (dated Aug. 10, 2016) 8 pages.
Unmask Blocked Caller ID [online] [retrieved Oct. 25, 2018]. Retrieved from the Internet: <https://web.archive.org/web/20161002230158/https://www.trapcall.com/>. (Oct. 2, 2016) 8 pages.
Zfone Lets You Whisper In Someone's Ear From a Thousand Miles Away [online] [retrieved Oct. 25, 2018]. Retrieved from the Internet: <https://web.archive.org/web/20160809205600/http://zfoneproject.com:80/>. (Aug. 9, 2016) 1 page.
"Robocall strike force report," Federal Communications Commission, Oct. 2016, pp. 1-45.
Alegre et al., "Evasion and obfuscation in automatic speaker verification," IEEE International Conference on Acoustics, Speech and Signal Processing, May 2014, pp. 1-5.
Amrutkar et al., "An empirical evaluation of security indicators in mobile web browsers," IEEE Transactions on Mobile Computing, Jul. 2013, pp. 1-17.
Balasubramaniyan et al., "PinDr0p: using single-ended audio features to determine call provenance," Proceedings of the ACM Conference on Computer and Communications Security, Oct. 2010, pp. 1-12.
Barkan et al., "Instant ciphertext-only cryptanalysis of GSM encrypted communication," CRYPTO 2003: Advances in Cryptology, Aug. 2003, pp. 600-616.
Baumann et al., "Voice over IP—Security and SPIT," Swiss Army, FU Br 41, KryptDet Report, Aug. 2006, pp. 1-34.
Blanchet, "An efficient cryptographic protocol verifier based on prolog rules," Proceedings of IEEE Computer Security Foundations Workshop, Jun. 2001, pp. 1-15.

(56) References Cited

OTHER PUBLICATIONS

Bresciani, "The ZRTP protocol—Security considerations," Technical Report LSV-07-20, May 2007, pp. 1-6.
Clark et al., "SoK: SSL and HTTPS: revisiting past challenges and evaluating certificate trust model enhancements," IEEE Symposium on Security and Privacy, May 2013, pp. 511-525.
Dabrowski et al., "The messenger shoots back: network operator based Imsi catcher detection," 19th International Symposium on Research in Attacks, Intrusions, and Defenses, Sep. 2016, pp. 1-23.
Dabrowski et al., "IMSI—catch me if you can: IMSI-catcher-catchers," Proceedings of the Annual Computer Security Applications Conference, Dec. 2014, pp. 1-11.
Dacosta et al., "Trust no one else: detecting MITM attacks against SSL/TLS without third-parties," 17th European Symposium on Research in Computer Security, Sep. 2012, pp. 1-18.
Dacosta et al., "Improving authentication performance of distributed SIP proxies," Proceedings of the 3rd International Conference on Principles, Systems and Applications of IP Telecommunications, Jul. 2009, pp. 1-11.
Dacosta et al., "Proxychain: developing a robust and efficient authentication infrastructure for carrier-scale VoIP networks," USENIX Annual Technical Conference, Jun. 2010, pp. 1-14.
Dantu et al., "Issues and challenges in securing VoIP," Computers and Security, Nov. 2009, pp. 1-11, Article in Press.
Egelman et al., "You've been warned: an empirical study of the effectiveness of web browser phishing warnings," Proceedings of the SIGCHI Conference on Human Factors in Computing Systems, Apr. 2008, pp. 1-10.
Enck et al., "Exploiting open functionality in SMS-capable cellular networks," Proceedings of the 12th ACM Conference on Computer and Communications Security, Nov. 2005, pp. 1-12.
Evans et al., "Anti-spoofing: voice conversion," Encyclopedia of Biometrics, Jul. 2015, pp. 1-11.
Hohlfeld et al., "Packet loss in real-time services: markovian models generating QoE impairments," 16th International Workshop on Quality of Service, Jun. 2008, pp. 239-248.
Jiang et al., "Isolating and analyzing fraud activities in a large cellular network via voice call graph analysis," Proceedings of the 10th International Conference on Mobile Systems, Applications, and Services, Jun. 2012, pp. 1-14.
Jin et al., "Is voice transformation a threat to speaker identification," IEEE International Conference on Acoustics, Speech and Signal Processing, Mar. 2008, pp. 4845-4848.
Katugampala et al., "Real-time end-to-end secure voice communications over GSM voice channel," 13th European Signal Processing Conference, Sep. 2005, pp. 1-4.
Keromytis, "A comprehensive survey of voice over IP security research," IEEE Communications Surveys and Tutorials, Apr. 2011, pp. 1-24.
Khan et al., "A review of methods for preventing spam in IP telephony," Modem Applied Science, Jul. 2013, pp. 48-58, vol. 7, No. 7.
Kinnunen et al., "Vulnerability of speaker verification systems against voice conversion spoofing attacks: the case of telephone speech," IEEE International Conference on Acoustics, Speech and Signal Processing, Mar. 2012, pp. 1-4.
Lee et al., "On the detection of signaling DoS attacks on 3G/WiMax wireless networks," Computer Networks, Oct. 2009, pp. 2601-2616, vol. 53.
Li et al., "Insecurity of voice solution VoLTE in LTE mobile networks," Proceedings of the 22nd ACM SIGSAC Conference on Computer and Communications Security, Oct. 2015, pp. 1-12.
Lindqvist., et al., "Cure for spam over internet telephony," 4th IEEE Consumer Communications and Networking Conference, Jan. 2007, pp. 1-5.
Mathieu et al., "SDRS: a voice-over-IP spam detection and reaction system," IEEE Security and Privacy, Nov./Dec. 2008, pp. 52-59.
Mustafa et al., "You can call but you can't hide: detecting caller ID spoofing attacks," 44th Annual IEEE/IFIP International Conference on Dependable Systems and Networks, Jun. 2014, pp. 1-20.
Ormazabal et al., "Secure SIP: a scalable prevention mechanism for DoS attacks on SIP based VoIP systems," Principles, Systems and Applications of IP Telecommunications. Services and Security for Next Generation Networks, Jul. 2008, pp. 107-132.
Ozkan et al., "Secure voice communication via GSM network," ELECO 2011 7th International Conference on Electrical and Electronics Engineering, Dec. 2011, pp. 267-271.
Papernot et al., "The limitations of deep learning in adversarial settings," First IEEE European Symposium on Security and Privacy, Mar. 2016, pp. 1-16.
Papernot et al., "Distillation as a defense to adversarial perturbations against deep neural networks," 37th IEEE Symposium on Security and Privacy, May 2016, pp. 1-16.
Petraschek et al., "Security and usability aspects of man-in-the-middle attacks on ZRTP," Journal of Universal Computer Science, Mar. 2008, pp. 673-692, vol. 14, No. 5.
Pries et al., "On the suitability of the short message service for emergency warning systems," IEEE 63rd Vehicular Technology Conference, May 2006, pp. 1-5.
Quinten et al., "Analysis of techniques for protection against spam over internet telephony," Meeting of the European Network of Universities and Companies in Information and Communication Engineering, Jul. 2007, pp. 70-77.
Reaves et al., "AuthLoop: practical end-to-end cryptographic authentication for telephony over voice channels," Proceedings of the 25th USENIX Security Symposium, Aug. 2016, pp. 963-978.
Reaves et al., "Boxed out: blocking cellular interconnect bypass fraud at the network edge," Proceedings of the 24th USENIX Security Symposium, Aug. 2015, pp. 833-848.
Rosset et al., "Discovery of fraud rules for telecommunications—challenges and solutions," Proceedings of the fifth ACM SIGKDD International Conference on Knowledge Discovery and Data Mining, Aug. 1999, pp. 409-413.
Ruhrmair et al., "Watermark-based authentication and key exchange in teleconferencing systems," IFIP International Conference on Communications and Multimedia Security, May 2010, pp. 75-80.
Schechter et al., "The emperor's new security indicators—an evaluation of website authentication and the effect of role playing on usability studies," IEEE Symposium on Security and Privacy, May 2007, pp. 1-15.
Serror et al., "Impact of paging channel overloads or attacks on a cellular network," Proceedings of the 5th ACM Workshop on Wireless Security, Sep. 2006, pp. 75-84.
Sherr et al., "Signaling vulnerabilities in wiretapping systems," IEEE Security and Privacy, Nov./Dec. 2005, pp. 13-25.
Shirvanian et al., "Wiretapping via mimicry: short voice imitation man-in-the-middle attacks on crypto phones," Proceedings of the 2014 ACM SIGSAC Conference on Computer and Communications Security, Nov. 2014, pp. 1-12.
Shirvanian et al., "On the security and usability of crypto phones," Proceedings of the 31st Annual Computer Security Applications Conference, Dec. 2015, pp. 1-10.
Simon et al., "Voice over IP: forensic computing implications," Australian Digital Forensics Conference, Dec. 2006, pp. 1-6.
Stylianou, "Voice transformation: a survey," IEEE International Conference on Acoustics, Speech and Signal Processing, Apr. 2009, pp. 3585-3588.
Tu et al., "New security threats caused by IMS-based Sms service in 4G LTE networks," Proceedings of the 2016 ACM SIGSAC Conference on Computer and Communications Security, Oct. 2016, pp. 1118-1130.
Tu et al., "SoK: Everyone hates robocalls: a survey of techniques against telephone spam," IEEE Symposium on Security and Privacy, May 2016, pp. 1-19.
Wu et al., "Detecting converted speech and natural speech for anti-spoofing attack in speaker recognition," 13th Annual Conference of the International Speech Communication Association, Sep. 2012, pp. 1-4.

* cited by examiner

IDENTITY AND CONTENT AUTHENTICATION FOR PHONE CALLS

CROSS-REFERENCE TO RELATED APPLICATION

This application claims the benefit of U.S. Provisional Patent Application Ser. No. 62/481,951, filed Apr. 5, 2017, which is incorporated herein by reference in its entirety, including any figures, tables, and drawings.

GOVERNMENT SUPPORT

This invention was made with government support under grant number 1617474 awarded by the National Science Foundation. The government has certain rights in the invention.

BACKGROUND

Telephones remain of paramount importance to society since their invention 140 years ago, and they are especially important for sensitive business communications, whistleblowers and journalists, and as a reliable fallback when other communication systems fail. When faced with critical or anomalous events, the default response of many organizations and individuals is to rely on the telephone. For instance, banks receiving requests for large transfers between parties that do not generally interact call account owners. Power grid operators that detect phase synchronization problems requiring careful remediation speak on the phone with engineers in adjacent networks. Even the Federal Emergency Management Agency (FEMA) recommends that citizens in disaster areas rely on phones to communicate sensitive identity information (e.g., social security numbers) to assist in recovery. In all of these cases, participants depend on telephony networks to help them validate claims of identity and integrity.

However, these networks were never designed to provide end-to-end authentication or integrity guarantees. Adversaries with minimal technical ability regularly take advantage of this fact by spoofing Caller ID, a vulnerability enabling over $7 billion in fraud in 2015. More capable adversaries can exploit weaknesses in core network protocols such as Signaling System 7 (SS7) to reroute calls and modify content. Unlike the web, where mechanisms such as Transport Layer Security (TLS) protect data integrity and allow experts to reason about the identity of a website, the modern telephony infrastructure simply provides no means for anyone to reason about either of these properties.

BRIEF SUMMARY

Embodiments of the present invention include methods and systems for call authentication. In an embodiment, a method can include an enrollment protocol that ensures users control the number they claim to own, a handshake protocol that mutually authenticates the calling parties, and a call integrity protocol that ensures the security of the voice channel and the content it carries. A server can act as either an endpoint or intermediary between user clients and a client-server architecture can be employed. All of the protocols can include end-to-end cryptography and the enrollment protocol can issue a certificate that binds the identity of the client to a phone number.

The enrollment protocol can include establishing a client C and an enrollment server S; C sending an enrollment request with S's identity, C's identity information, C's phone number, and C's public key; S sending a nonce ($N_{Net}$), the identities of C and S and the phone numbers of C and S with a timestamp to ensure freshness, liveness, and to provide a "token" for the particular authentication session; S confirming that C controls the phone number it claims, which can include S placing a call to C's claimed phone number, and S transmitting a nonce over the voice channel when a call is answered; C sending both $N_{Net}$ and $N_{Audio}$ (an audio nonce; e.g., a random number) along with the IDs of the server, client, a timestamp, and a signature covering all other fields; and S replying with a signed certificate issued to C. The enrollment protocol can further include an out-of-band process for verifying the identity of certificates (particularly high-value certificates), authentication of supporting documentation, and/or CNAM3 look ups.

The handshake protocol can include a first phase indicating to the server and the calling party that a call is imminent and a second phase of authenticating both parties on the call and establishing shared secrets, which may only be known end-to-end and computed in a manner that preserves perfect forward secrecy. The first phase of the handshake protocol can include a caller R indicating to a server S that R would like to place a call to the callee E; S informing the callee E that an authenticated voice call is incoming; and S informing R whether E is using call authentication. S may also indicate to R whether R should expect to complete a handshake for this call if E is available and chooses to accept the call. The second phase of the handshake protocol can include Diffie-Hellman key establishment authenticated with a signature key defined in the certificate of R or E.

The call integrity protocol can include confirming that the voice call has been established and confirming when the call ends. Furthermore, content authentication information can be exchanged for the duration of the call using "digests" of call audio, which can be authenticated with hash message authentication codes (HMACs). The caller R and callee E can send audio digests at regular intervals and the caller R and callee E can send a message indicating that the voice call is complete, which can contain a timestamp with an HMAC.

Embodiments of the present invention can provide end-to-end guarantees of authentication and call content integrity over modern phone networks (e.g., landline, cellular, or VoIP) with negligible latency and overhead. While most phones have access to some form of data connection, that connection is often not robust or reliable enough to support secure VoIP phone calls. Embodiments of the present invention can use a low-bitrate data connection to mutually authenticate both parties of a phone call with strong cryptography before the call is answered. Even in the worst case, this authentication adds at most a negligible 1.4 seconds to call establishment. Once a call is established, the call audio can be bound to the original authentication using specialized, low-bandwidth digests of the speech in the call. These digests protect the integrity of call content and can distinguish legitimate audio modifications attributable to the network from 99% of maliciously tampered call audio, while a typical user would expect to see a false positive only once every six years. Embodiments of the present invention introduce the first practical system to use digests to ensure that received call audio originated from the legitimate source and has not been tampered with by an adversary. Most critically, embodiments of the present invention can provide these guarantees for standard telephone calls without requiring changes to the core network.

Embodiments of the present invention provide a mechanism to mitigate many open security problems in telephony.

The most obvious problems are attacks that rely on Caller ID fraud, like the perennial "IRS scams" in the United States. In these scams, criminals spoof caller ID and call potential victims, accuse them of owing a large amount of back taxes that would result in a jail sentence, then offer to settle the "debt" immediately for a tidy sum. Under pressure from regulators, carriers in the US have recently implemented measures to stop this specific attack by blocking most inbound calls from the IRS. While this individual agency has been able to adapt to this restriction, many other agencies and services rely on the ability to place outgoing calls as a crucial part of their operations. In general, denying outgoing call service to victims of call fraud is unacceptable.

Another problem is that, for sensitive transactions, many institutions including banks and utilities, have to use extensive and error-prone challenge questions to authenticate their users. However, these challenges still fail to stop targeted social engineering attacks. Embodiments of the present invention offer strong methods to authenticate users before and during a call, increasing security while reducing the amount of time and effort required by customers and call center workers.

Yet another valuable application of embodiments of the present invention is emergency services (e.g., 911). These services have faced denial of service attacks that have made it impossible for legitimate callers to receive help. It could be beneficial in these scenarios for essential services to prioritize authenticated calls while answering other calls opportunistically. This would improve the acceptance of emergency calls for users that would otherwise have a low probability of success. Authenticating end users is also advantageous for safely responding to emergencies. An increasingly common social engineering attack is "swatting," which uses Caller ID spoofing to dial 911 claiming an active shooter or other situation that prompts a rapid, heavily armed response. These attacks endanger the lives of their targets and the police who respond. Using embodiments of the present invention, authorities can have greater confidence in the source of a report and allowing for an appropriately measured response.

DETAILED DESCRIPTION

Figure 1:
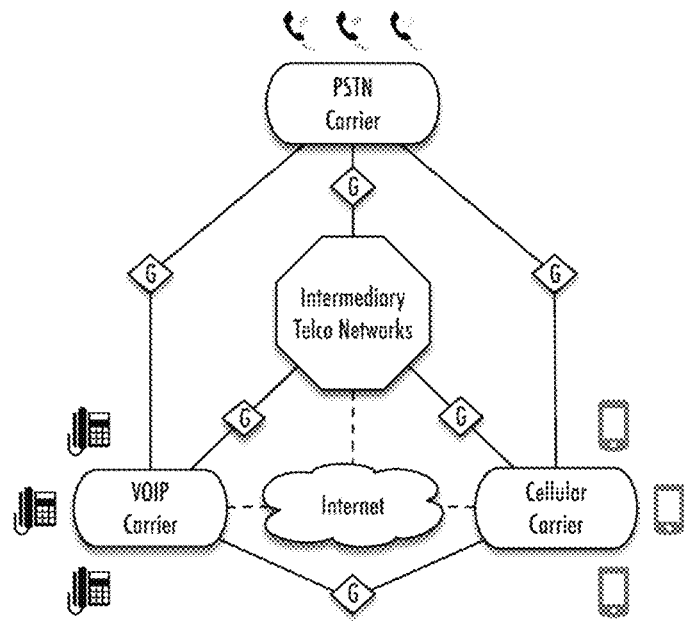
FIG. 1 shows a diagram of a modern phone network in which calls are often routed through gateways at network boundaries that remove authentication information and modify call audio.

Modern telephony systems are composed of a mix of technologies. As shown in FIG. 1, the path between a caller and callee may transit through multiple networks consisting of mobile cores, circuit-switched connections and packetswitched backbones. While the flow of a call across multiple network technologies is virtually invisible to customers, significant transformations occur to call audio between the source and destination. Whereas the content of data packets on the Internet should not be modified between source and destination, call audio is transcoded by gateways to ensure that it is compatible with the underlying network. As such, users of the global telephony infrastructure can only be guaranteed that an approximate but not bitwise identical representation of their voice will be delivered to the other end of the call.

Any other data that may be generated by a user or their home network is not guaranteed to be delivered or authenticatable end-to-end. That is, because the underlying technologies are heterogeneous, there is no assurance that information generated in one system is passed (yet alone authenticated) to another. This has two critical implications. The first is that any proofs of identity a user may generate to their provider are not sent to the other end of the call. For instance, a mobile phone on a 4G LTE connection performs strong cryptographic operations to prove its identity to its provider. However, there is no means to share such proofs with a callee within this system, yet alone one in another provider's network. Second, claims of identity (e.g., Caller ID) are sent between providers with no means of verifying said claims. As evidenced by greater than $7 billion in fraud in 2015, it is extremely simple for an adversary to trick a receiver into believing any claim of identity. There is no simple solution as calls regularly transit multiple intermediate networks between the source and destination.

It is increasingly common that modern phones have simultaneous access to at least low-bitrate data channels. VoIP phones naturally have a secondary data channel, the majority of mobile phones allow users to both talk and use data networks simultaneously, and even some circuit-switched connections (e.g., ISDN) provide phones with a data connection. The presence of these data services does not mean that all calls can be simply converted to VoIP. For example, cellular data in many places does not support the high data-rate or quality of service necessary for intelligible calls. Moreover, it is unlikely that any provider will entirely scrap their non-VoIP infrastructure. Embodiments of the present invention can utilize this low-bitrate data channel to create a uniform means of end-to-end authentication across the heterogeneous mechanisms for delivering call audio.

In order to authenticate voice calls and content, authentication systems need to face adversaries with a range of capabilities. The simplest adversary will attempt to commit phone fraud by spoofing Caller ID when calling a target. An equivalent form of this attack may occur by the adversary tricking their target into calling an arbitrary number under their control (e.g., via spam or phishing) and claiming to represent some other party (e.g., a financial institution). Additionally, this adversary may perform a call forwarding attack, which forces a target calling a legitimate number to be redirected to the adversary. Lastly, the adversary may place a voice call concurrent with other legitimate phone calls in order to create a race condition to see which call arrives at the destination first. In all of these cases, the goal of the adversary is to claim another identity for the purpose of extracting sensitive information (e.g., bank account numbers, usernames, and passwords).

Figure 2:
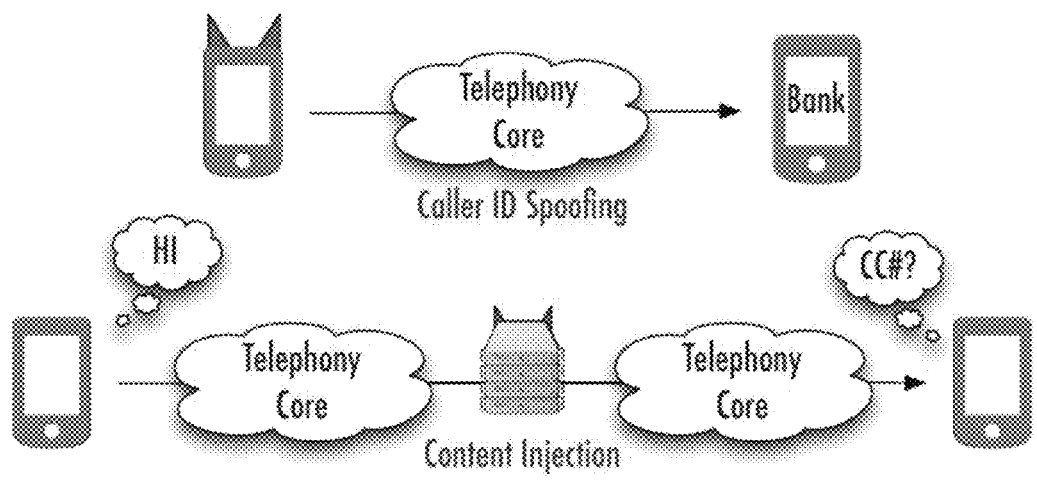
FIG. 2 shows a broad overview of potential attacks on Caller ID and call content in the current telephony landscape.

A more sophisticated adversary may gain access to a network core via vulnerabilities in systems such as SS7, or improperly protected legal wiretapping infrastructure. This adversary can act as a man-in-the-middle, and is therefore capable of redirecting calls to an arbitrary endpoint, hanging up one side of a call at any point in time, and removing/injecting audio to one or both sides. Such an adversary is much more likely to require nation-state level sophistication, but exists nonetheless. Examples of both classes of adversary are shown in FIG. 2.

Given that the bitwise encoding of audio is unlikely to be the same at each endpoint, end-to-end encryption is generally not a viable means of protecting call content or integrity across the heterogeneous telephony landscape. Moreover, while the majority of phones have access to at least a low-bandwidth data connection, solutions that demand high speed data access at all times (i.e., pure VoIP calls) do not offer solutions for the vast majority of calls (i.e., cellular calls). Finally, there is little to no ability to make changes throughout the vast and disparate technologies that make up the core networks of modern telephony. Therefore, embodiments of the present invention can address this problem in an end-to-end fashion.

For explaining the concepts of embodiments of the present invention, four participants are defined: the Caller (R), the Callee (E), the Server (S), and the Adversary (Adv). Callers and Callees can register as described below and generate credentials including a public key. Embodiments of the present invention can achieve the following security goals in the presence of the above-described adversaries: 1) (G1) Proof of Number Ownership: During the process of registration, R will actively demonstrate ownership of its claimed Caller ID to S before it receives a signed certificate; 2) (G2) Authentication of the Caller: E will be able to cryptographically verify the identity of R prior to accepting an incoming call; 3) (G3) Authentication of the Callee: R will be able to cryptographically verify the identity of E as soon as the call begins; 4) (G4) Integrity Protection of Call Content: Both R and E will be able to verify that the analog voice content has not been meaningfully altered, or that new content has not been injected by a man in the middle. Additionally, both will be protected against concurrent call attacks; 5) (G5) Proof of Liveness: Both R and E will be able to detect if the other party is no longer on the call, perhaps as the result of a man in the middle attempting to engage in the call after the initial authentication phase.

Embodiments of the present invention can use three different protocols to meet its security goals including Enrollment, Handshake, and Call Integrity protocols. These protocols can make use of certificates issued to each client that indicate that a particular client controls a specific phone number. The prior art has proposed a full public key infrastructure for telephony called a "TPKI" that would have as its root the North American Numbering Plan Administration with licensed carriers acting as certificate authorities. This PKI would issue an authoritative certificate that a phone number is owned by a particular entity, and it can be ensured that calls take place between the entities specified in those certificates. While embodiments of the present invention can leverage the proposed TPKI, a fully-deployed TPKI is not necessary as embodiments of the present invention can act as their own certificate authority (this is discussed further in the enrollment protocol).

Protocols of embodiments of the present invention can make use of a client-server architecture in which a server acts as either an endpoint or intermediary between user clients. There are several reasons why this can be advantageous. First, having a centralized relay can simplify the development of systems of embodiments of the present invention. Second, it allows the server to prevent abuses such as robodialing by a single party by implementing rate limitations. The server can authenticate callers before allowing the messages to be transmitted, providing a mechanism for banning misbehaving users. Finally, all protocols (including handshake and enrollment) can implement end-to-end cryptography. Assuming the integrity of the certificate authority infrastructure and the integrity of the client, no other entity of networks of embodiments of the present invention can read or fabricate protocol messages. It can also be assumed that all communications between clients and servers use a secure TLS configuration with server authentication.

Protocols of embodiments of the present invention can accomplish another goal—no human intervention other than choosing to accept a call. There are two primary reasons for this. First, it is well established that ordinary users (and even experts) have difficulty executing secure protocols correctly. Second, in other protocols that rely on human interaction, the human element has been shown to be the most vulnerable.

The following paragraphs detail three different protocols of embodiments of the present invention. The first protocol, the enrollment protocol, can ensure that a given user actually controls the phone number they claim to own (G1). The enrollment protocol can also issue a certificate to the users. The second protocol, the handshake protocol, can mutually authenticate two calling parties at call time (G2 and G3). The final protocol, the call integrity protocol, can ensure the security of the voice channel and the content it carries (G4 and G5).

The Enrollment protocol can ensure that a client controls a claimed number and establishes a certificate that binds the identity of the client to a phone number. "Identity" may be a user's name, organization, or any other pertinent information. Binding the identity to a phone number is helpful because phone numbers are used as the principal basis of identity and routing in phone networks, and they can also be used as such in embodiments of the present invention. The enrollment protocol is similar to other certificate issuing protocols but with the addition of a confirmation of control of the phone number.

Figure 3:
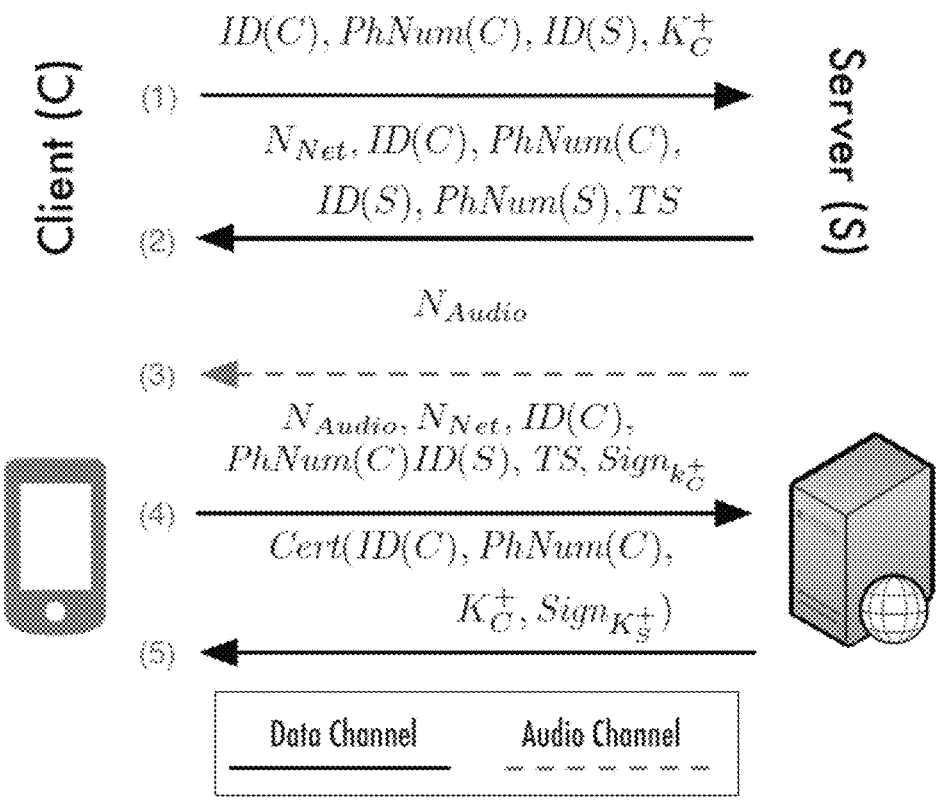
FIG. 3 shows an enrollment protocol of an embodiment of the present invention that confirms phone number ownership and issues a certificate.

FIG. 3 shows the details of an enrollment protocol of embodiments of the present invention. The enrollment protocol has two participants: a client C and an enrollment server S. In message 1, C sends an enrollment request with S's identity, C's identity information, C's phone number, and C's public key. In message 2, the server sends a nonce $N_{Net}$, the identities of C and S and the phone numbers of C and S with a timestamp to ensure freshness, liveness, and to provide a "token" for this particular authentication session.

In message 3, the server begins to confirm that C controls the phone number it claims. The number is confirmed when S places a call to C's claimed phone number. When the call is answered, S transmits a nonce over the voice channel. Having S call C is a critical detail because intercepting calls is far more difficult than spoofing a source number. Using a voice call is important because it will work for any phone—including VoIP devices that may not have SMS access.

In message 4, C sends both $N_{Net}$ and $N_{Audio}$ along with the IDs of server, client, a timestamp, and a signature covering all other fields. This final message concludes the proof of three things: possession of $N_{Net}$, the ability to receive a call by providing $N_{Audio}$ and possession by C of the private key $K_{\overline{C}}$ by virtue of signing the message.

In message 5, S replies with a signed certificate issued to C. This completes the enrollment protocol.

It should be noted this protocol is subject to the same limitations on certifying identity as every other Internet certificate authority. In particular, an out-of-band process may be needed to verify identity for high-value certificates, and may require the ability to authenticate supporting documentation. Embodiments of the present invention can also incorporate the use other authoritative information sources like CNAM3 lookups to verify number ownership in some cases. While no system or process is perfect, these types of policies have been largely effective on the Internet.

It should also be noted that this is a trust-on-first-use (TOFU) protocol. While the protocol is secure in the presence of passive adversaries on both the data and voice networks, if an adversary can actively intercept a call addressed to a victim phone number (and also supply any out-of-band identity confirmation), they may be able to obtain a certificate for a number they illicitly control. If a TPKI were deployed (which can be included in embodiments of the present invention), this attack would not be possible. Even without a TPKI, the likelihood of a successful attack is limited. Success is limited because the attack would eventually be detected by the legitimate owner when they attempt to register or authenticate using the legitimate number. To further protect against the prior attack, protocols of embodiments of the present invention can meet an additional goal: human interaction is not required for enrollment and confirming control of the claimed phone number. This means that automatic periodic reverification of phone number control is possible. This is important to prevent long-term effects of a brief phone number compromise, but also for more mundane issues like when phone numbers change ownership.

Figure 4:
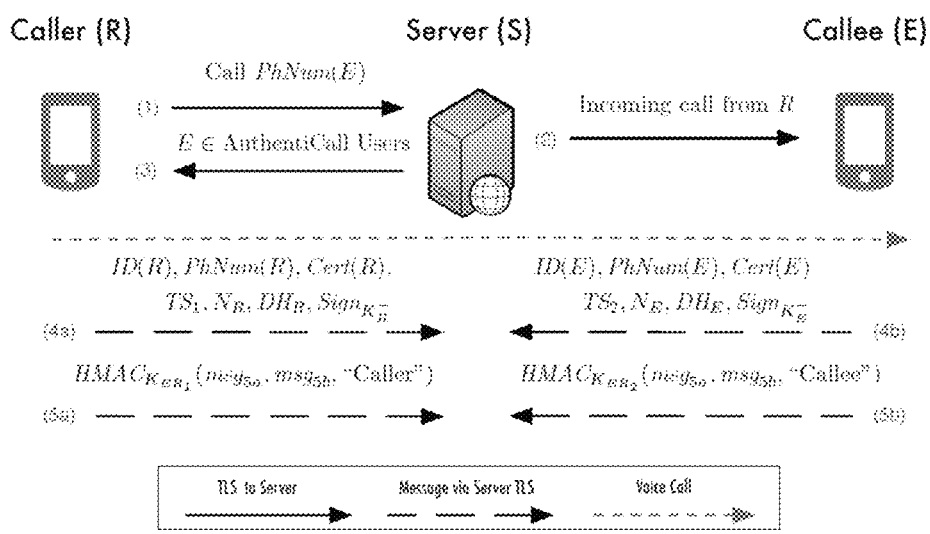
FIG. 4 shows a handshake protocol of an embodiment of the present invention that mutually authenticates both parties.

The handshake protocol can take place when a caller intends to contact a callee. In this protocol, the caller can place a voice call over the telephone network while simultaneously using a data connection to conduct the handshake protocol. The handshake protocol can comprise two phases. The first indicates to the server and the calling party that a call is imminent. The second phase authenticates both parties on the call and establishes shared secrets. These secrets are only known end-to-end and are computed in a manner that preserves perfect forward secrecy. FIG. 4 shows the handshake protocol.

The first phase comprises messages 1-4. In message 1, a caller R indicates to a server S that R would like to place a call to the callee E. In message 2, S informs the callee E that an authenticated voice call is incoming.

In message 3, S informs R whether E is using call authentication according to embodiments of the present invention, but does not provide information about E's presence or availability. Message 3 has several aims. The first is to protect the privacy of E. A strawman mechanism to protect privacy allows embodiments of the present invention to avoid providing information about E until E agrees to accept the call. However, this presents a problem—if an adversary tampers or blocks messages from E, it prevents E from participating in the handshake, and R would have to assume (in the absence of outside knowledge) that E is not using call authentication. This could allow an adversary to evade detection.

To solve this problem, S can simply indicate to R whether R should expect to complete a handshake for this call if E is available and chooses to accept the call. This reveals only E's preference to authenticate a phone call, and nothing about her availability or whether she has chosen to accept or reject a call. Protecting this information is important because if an unwanted callee knows that a user is available, they may call repeatedly or use that information in other undesirable ways (e.g., harassment or telemarketing). If message 3 indicates that E is not using call authentication and E does not choose to accept the call, R must wait for the call request to time out. From R's perspective, this is no different from dialing and waiting for a busy signal or voicemail and should add little to no latency to the call. If message 3 indicates that E is not using call authentication, the protocol ends at this step and R is forced to fallback to an insecure call.

The second handshake phase authenticates R and E and comprises messages 4A-B and 5A-B. These messages are indicated by letters A and B because the messages contain the same fields for caller and callee respectively. They can be computed independently and sent in parallel, reducing round trip latencies.

Message 5 contains all information necessary for a Diffie-Hellman key establishment authenticated with a signature key defined in the certificate of R or E. It also contains identity information for R or E, the calling or called phone number, a timestamp, and a nonce. Each side also provides a Diffie-Hellman share, and the entire message is signed with the public key in the certificate issued.

After message 5, both sides combine their Diffie-Hellman secret with the share they received to generate the derived secret. Each client then generates keys using the Diffie-Hellman result, the timestamps of both parties, and the nonces of both parties.

Message 6A and 6B contain an HMAC of messages 5A and B along with a string to differentiate message 6A from message 6B. The purpose of this message is to provide key confirmation that both sides of the exchange have access to the keys generated after messages 5A and B. This message can conclude the handshake protocol.

The call integrity protocol binds the handshake conducted over the data network to the voice channel established over the telephone network. Part of this protocol confirms that the voice call has been established and confirms when the call ends. The remainder of the messages in this protocol exchange content authentication information for the duration of the call. This content integrity takes the form of short "digests" of call audio, which will be discussed in the following paragraphs. These digests are effectively heavily compressed representations of the call content; they allow for detection of tampered audio at a low bit rate. Additionally, the digests are exchanged by both parties and authenticated with HMACs.

Figure 5:
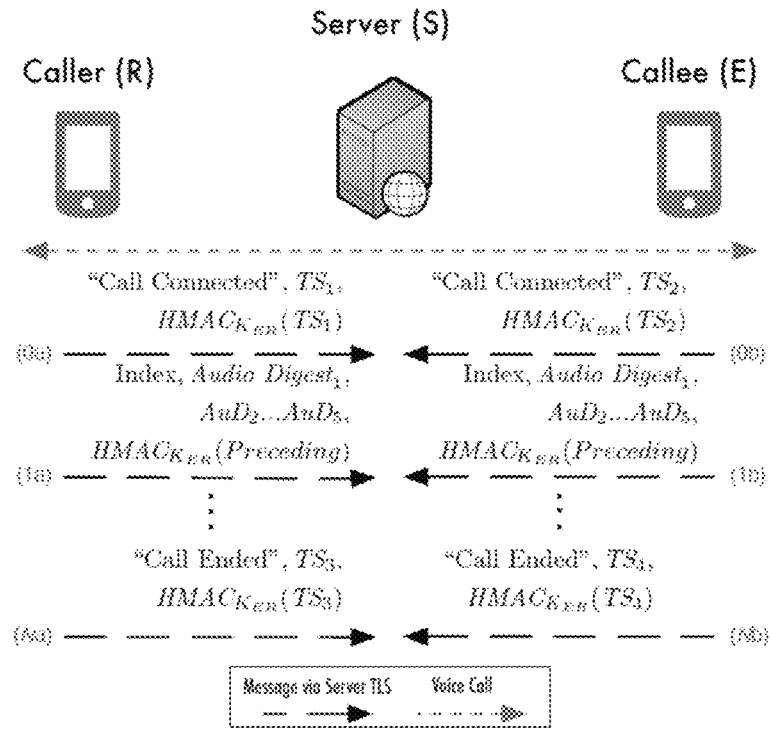
FIG. 5 shows a call integrity protocol of an embodiment of the present invention that can protect all speech content.

FIG. 5 shows the details of the call integrity protocol. The protocol can begin after the voice call is established. Both caller R and callee E send a message indicating that the voice call is connected. This message includes a timestamp and HMAC of the timestamp. These messages are designed to prevent attacks where a call is redirected to another phone. One possible attack is an adversary maliciously configuring call forwarding on a target; the handshake would be conducted with the target, but the voice call would be delivered to the adversary. In such a case, the target would not send a "call established" message and the attack would fail.

Once the voice call begins, each side can send the other audio digests at regular intervals. This message can be protected with an HMAC to prevent a network adversary from tampering with the audio digests. When the voice call ends, each side can send a "call concluded" message containing a timestamp with an HMAC. This alerts the end point to expect no more digests. It also prevents a man-in-the-middle from continuing a call that the victim has started and authenticated.

ProVerif was used to analyze the handshake and enrollment protocols of embodiments of the present invention. The analysis verified that the handshake protocol establishes and never leaks the secret key. The protocol also provides authentication and perfect forward secrecy for both the caller and callee. The enrollment protocol is verified to never leak the private keys of either party. This property allows supports the fact that that both signatures and certificates cannot be forged.

During a call, systems of embodiments of the present invention can summarize speech content in order to authenticate audio using a low-bandwidth data connection. These summaries will be referred to as "speech digests." A speech digest has at least two goals. First, it should accurately summarize the content of the call; however, it is not necessary for this summary to be lossless or meaningful for human interpretation. Furthermore, semantics (i.e., words spoken) are more important than speaker voice characteristics (e.g., tone, identity) or extraneous features like noise. Second, the digest should be robust to non-semantic changes in audio.

Because of ambient or electronic noise, intermittent loss, and the use of differing encodings throughout the phone network, the audio transmitted by a phone will not be the same as the audio received. In particular, the audio received is practically guaranteed to be different on a bit level to the audio sent by the phone. This means that common data digest approaches like cryptographic hashes will fail.

While the original phone system used analog transmission of voice, it is now common in every telephone network (landline, VoIP, cellular, etc.) for speech to be digitized and compressed using an audio codec. At network boundaries, it is common for audio to be decoded and recoded into a different codec (known as transcoding). Codecs used in phone networks are generally lossy and can drastically distort the call audio, and so have the potential to significantly impact audio digest performance. In digital audio systems, voice data is encoded into discrete frames of 10-30 milliseconds (depending on codec choice and other factors) of audio that are transmitted. Because some phone systems (especially cellular and VoIP) use lossy networks for transmission, frames are routinely lost. For example, loss rates of 4% are considered nominal for cellular voice. Finally, for a digest scheme to be effective, the digests must be computed on the same audio, requiring time synchronization on both ends of the call to know where each digest should start and end. It will be discussed how synchronization can be achieved, but it should be noted that slight deviations in synchronization are likely, and digests should account for all of the above realities.

To accomplish these goals, signal processing techniques including "perceptual hashes" or "robust hashes" can be implemented. Unlike cryptographic hashes, which can change drastically with small changes in input, robust digests give very similar outputs for similar inputs. Robust digests can incorporate a wide domain of inputs, including music, images, and speech, but their applicability has remained limited. The following paragraphs provide a description of speech digests that can be used in embodiments of the present invention as well as a thorough analysis of the performance of these digests for telephone calls.

There are a number of constructions of speech digests, and they can all use the following basic process. First, they compute derived features of speech. Second, they define a compression function to turn the real-valued features into a bit string. Embodiments of the present invention can use robust speech hashing (RSH). This technique can be beneficial because it provides good performance on speech at a low bitrate, among other properties. Evaluations show that robust speech hashing (RSH) can maintain audio integrity. The construction also selects audio probabilistically and it will be shown that the digest can protect all of the semantic content in the input audio.

Figure 6:
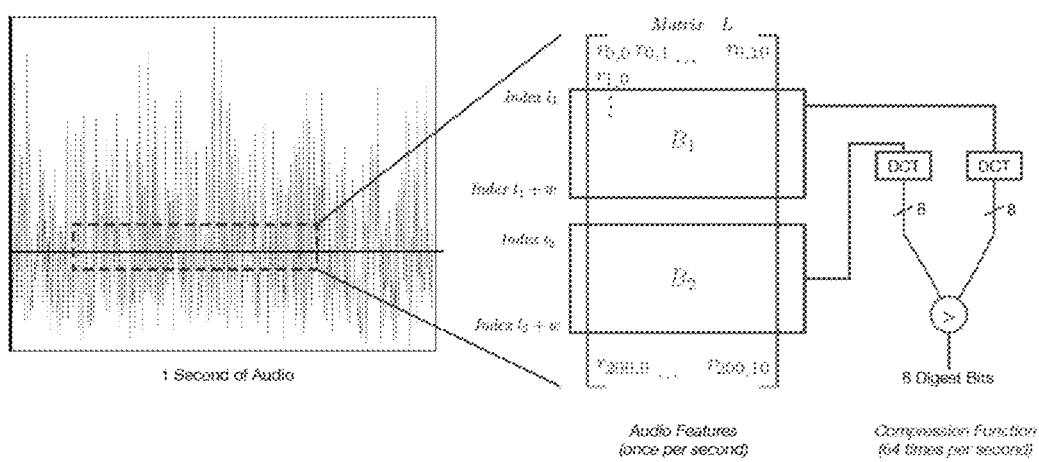
FIG. 6 illustrates a digest construction of an embodiment of the present invention in which audio digests summarize call content by taking one second of speech data, deriving audio features from the data, and compressing blocks of those features into a bit string.

FIG. 6 illustrates how RSH computes a 512-bit digest for one second of audio. In the first step of calculating a digest, feature computation, RSH computes the Line Spectral Frequencies (LSFs) of the input audio. LSFs are commonly used in speech compression algorithms to represent the major frequency components of the human voice (known as formants), which contain the majority of semantic information in speech. That is, LSFs represent phonemes—the individual sound units present in speech. While pitch is useful for speaker recognition, LSFs are not a perfect representation of all of the nuances of human voice. This is one reason why it is sometimes difficult for humans to confidently recognize voices over the phone. This means that the digest more accurately represents semantic content rather than the speaker's voice characteristics. This is important because a number of techniques are able to synthesize new speech that evades speaker recognition from existing voice samples. Finally, LSFs are numerically stable and robust to quantization—meaning that modest changes in input yield small changes in output. In RSH, the input audio is grouped into 30 ms frames with 25 ms audio overlap between frames, and 10 line spectral frequencies are computed for each frame to create a matrix L.

The second phase of digest computation involves compressing a large amount of information about the audio into a digest. Because audio rarely changes on millisecond time scales, the representation L is highly redundant. To compress this redundant data, RSH can use a two-dimensional discrete cosine transform (DCT). The DCT is related to the Fourier transform, is computationally efficient, and is commonly used in compression algorithms (e.g., JPEG, MP3). RSH computes the DCT over different sections of the matrix L to produce the final digest. RSH may use only the first eight DCT coefficients (corresponding to the highest energy components and discarding high-frequency information).

The second phase of digest computation—the compression function—can use the DCT algorithm in the computation of the bitwise representation of the audio sample. The following process generates 8 bits of a digest (for example); it can be repeated 64 times to generate a 512 bit digest: (1) Obtain a window size w and two window start indexes $l_1$ and $l_2$ from the output of a keyed pseudorandom function; (2) Select from L two blocks of rows. These blocks $B_1$ and $B_2$ contain all columns from $l_1:l_1+w$ and $l_2:l_2+w$ respectively; (3) Compress these individual blocks into eight coefficients each using the DCT; (4) Set eight digest bits by whether the corresponding coefficients of the first block ($B_1$) are greater than the coefficients of the second block ($B_2$).

It is recognized that sections of audio are selected probabilistically, but it will be shown below that the probability that a section of audio is not used in a digest is negligible. This simply means that digests cover practically all content in the call. An important thing to consider is that the digest is keyed. These digests are clearly not intended to be used for the same purposes as a cryptographic hash, and the use of a key in these functions is for a different purpose than keying in a cryptographic construction. By using a pseudorandom function, digests become dependent on time. This dependence adds entropy to digest construction so that repeated phrases generate unique digests. It also has the advantage that it makes it difficult to compute digests for audio without knowledge of the key, which can be derived during the handshake for each call. Digests themselves can also be authenticated using an HMAC to guarantee digest integrity in transit.

Digests are computed by the caller and are received and verified by the callee. The verifying party computes the digest of the received audio, then computes the hamming distance between the calculated and received digests. Because degradation of audio over a phone call is expected, digests will not match exactly. However, the Hamming distance between two audio digests—or bit error rate (BER)—is related to the amount of change in the audio. By setting an appropriate threshold on BER, legitimate audio can be distinguished from incorrect audio.

Cellular networks use expensive and heavy weight signaling protocols for voice calls and SMS, and under heavy load can face "signaling storms" that make network services unavailable. Any system that affects call signaling must be careful not to increase signaling load on the network. Embodiments of the present invention does not significantly increase signaling load for two reasons. First, in modern networks (3G and 4G), data signaling is no longer as expensive as a voice call, and simultaneous voice and data use is common place. This simply means that, from a network perspective, embodiments of the present invention will appear as normal user traffic. Second, the caller only needs to contact a server when placing a call, and the callee is notified using a popular push messaging service shared by many other apps, so the marginal data load is minimal.

Any system that relies upon certificates faces the problem of setting expiration policies and handling certificate revocation. A centralized model of an embodiment of the present invention can provide a simple revocation mechanism. While keys are securely established end-to-end, certificates used in the handshake are visible to the server. While passing messages, the server can verify that the certificate identifier is not in a list of revoked certificates. Certificate lifetime is another matter. Certificate lifetime policies must balance a number of considerations. Short expirations are preferred because they reduce the likelihood that a user can authenticate phone numbers for a number no longer under her control. Short expirations also reduce the impact of a private key compromise. The main argument for longer certificate lifetimes is to minimize the cost and effort of renewing a certificate. However, certificate authentication in embodiments of the present invention can be a simple, automated process. Accordingly, setting very short lifetimes is not costly, and monthly renewal is a practical method of ensuring that users still control the phone number associated with their accounts. As previously mentioned, embodiments of the present invention can make use of the proposed Telephony PKI. In this scenario, certificate lifetime would be determined by the TPKI, and revocation managed by a certificate revocation list (CRL) published by the TPKI.

The subject invention includes, but is not limited to, the following exemplified embodiments.

Embodiment 1

A method for call authentication comprising:
an enrollment protocol (to ensure users actually control the number they claim to own);
a handshake protocol (to mutually authenticate two calling parties); and
a call integrity protocol (to ensure the security of the voice channel and the content it carries).

Embodiment 2

The method according to Embodiment 1, wherein a server acts as either an endpoint and/or intermediary between user clients (or client-server architecture is employed).

Embodiment 3

The method according to any of Embodiments 1 to 2, wherein all of the protocols implement end-to-end cryptography.

Embodiment 4

The method according to any of Embodiments 1 to 3, wherein the enrollment protocol issues a certificate that binds the identity of the client to a phone number.

Embodiment 5

The method according to any of Embodiments 1 to 4, wherein the enrollment protocol includes:
establishing a client C and an enrollment server S;
(message 1) C sending an enrollment request with S's identity, C's identity information, C's phone number, and C's public key;
(message 2) S sending a nonce (NNet), the identities of C and S and the phone numbers of C and S with a timestamp to ensure freshness, liveness, and to provide a "token" for the particular authentication session;

(message 3) S confirming that C controls the phone number it claims, which can include S placing a call to C's claimed phone number, and S transmitting a nonce over the voice channel when a call is answered;

(message 4) C sending both $N_{Net}$ and $N_{Audio}$ along with the IDs of server, client, a timestamp, and a signature covering all other fields; (this message may conclude the proof of possession of $N_{Net}$, the ability to receive a call by providing $N_{Audio}$, and possession by C of the private key $\overline{c}$ by virtue of signing the message); and (message 5) S replying with a signed certificate issued to C.

Embodiment 6

The method according to any of Embodiments 1 to 5, wherein the enrollment protocol includes an out-of-band process for verifying identity of certificates (particularly high-value certificates), authentication of supporting documentation, and/or CNAM3 look ups.

Embodiment 7

The method according to any of Embodiments 1 to 6, wherein the handshake protocol includes a first phase indicating to the server and the calling party that a call is imminent and a second phase of authenticating both parties on the call and establishing shared secrets (which are only known end-to-end and are computed in a manner that preserves perfect forward secrecy).

Embodiment 8

The method according to any of Embodiments 1 to 7, wherein the first phase of the handshake protocol includes:

(message 1) a caller R indicating to a server S that R would like to place a call to the callee E;

(message 2) S informing the callee E that an authenticated voice call is incoming; and (message 3) S informing R whether E is using call authentication ("the method") (S may or may not provide information about E's presence or availability; S may also indicate to R whether R should expect to complete a handshake for this call if E is available and chooses to accept the call; if message 3 indicates that E is not using call authentication, the protocol can end at this step and R is forced to fallback to an insecure call).

Embodiment 9

The method according to any of Embodiments 1 to 8, wherein the second phase of the handshake protocol includes a key agreement protocol (e.g., Diffie-Hellman key establishment authenticated with a signature key defined in the certificate of R or E).

Embodiment 10

The method according to any of Embodiments 1 to 9, wherein the call integrity protocol includes confirming that the voice call has been established and confirming when the call ends.

Embodiment 11

The method according to any of Embodiments 1 to 10, wherein the call integrity protocol includes exchanging content authentication information for the duration of the call (e.g., using "digests" of call audio, which can be authenticated with HMACs).

Embodiment 12

The method according to any of Embodiments 1 to 11, wherein the call integrity protocol includes the caller R and callee E sending audio digests at regular intervals (which can be protected with HMAC).

Embodiment 13

The method according to any of Embodiments 1 to 12, wherein the call integrity protocol includes the caller R and callee E sending a message indicating that the voice call is complete (which can contain a timestamp with an HMAC).

Embodiment 14

The method according to any of Embodiments 1 to 13, wherein the method includes the use of perceptual hashes or robust hashes.

Embodiment 15

The method according to any of Embodiments 1 to 14, wherein the method includes the use of digests (e.g., by computing the line spectral frequencies of the input audio and compressing data). The digests can be keyed.

A greater understanding of the subject invention and of its many advantages may be had from the following example, given by way of illustration. The following example is illustrative of some of the methods, applications, embodiments, and variants of the subject invention. It is, of course, not to be considered as limiting the invention. Numerous changes and modifications can be made with respect to the invention.

Example 1

The properties of RSH digests were evaluated including the effects of legitimate transformations and the results of comparing digests of unrelated audio samples (as might be generated by an adversary). It will also be explained how embodiments of the present invention can use digests to detect tampered audio.

RSH was implemented using Matlab, and it was deployed in prototypes of embodiments of the present invention using the Matlab Coder toolbox to generate C code that is compiled as an Android native code library. TIMIT audio corpus was used as a standard test dataset for speech processing systems. It comprises high-fidelity recordings of 630 male and female speakers reading 10 English sentences constructed for phonetic diversity. Because RSH computes hashes of one second of audio, the TIMIT audio data was split into discrete seconds of audio corresponding to a unique section of audio from a speaker and sentence. This resulted in 22,487 seconds of unique audio.

Robustness is one of the most critical aspects of the speech digests, and it is important to show that these digests will not significantly change after audio undergoes any of the normal processes that occur during a phone call. These include the effects of various audio encodings, synchronization errors in audio, and noise. To test robustness, modified audio was generated from the TIMIT corpus and the BER of digests of standard TIMIT audio was compared to digests of degraded audio. The TIMIT audio was first downsampled to a sample rate of 8 kHz, which is standard for most telephone systems. A sox audio utility was used for downsampling and adding delay to audio to model synchronization errors. Sox was also used to convert the audio to two common phone codecs, AMR-NB (Adaptive Multi-Rate Narrow Band) and GSM-FR (Groupe Sp'ecial Mobile Full-Rate). GNU Parallel was used to quickly compute these audio files. To model frame loss behavior, Matlab simulations were constructed that implement a Gilbert-Elliot loss model. Gilbert-Elliot models bursty losses using a two-state Markov model parameterized by probabilities of individual and continued losses. The standard practice of setting the probability of an individual loss (p) and probability of continuing the burst (1−r) to the desired loss rate of 5% was used in the experiments. Matlab's agwn function was also used to add Gaussian white noise at a 30 decibel signal to noise ratio.

Figure 7:
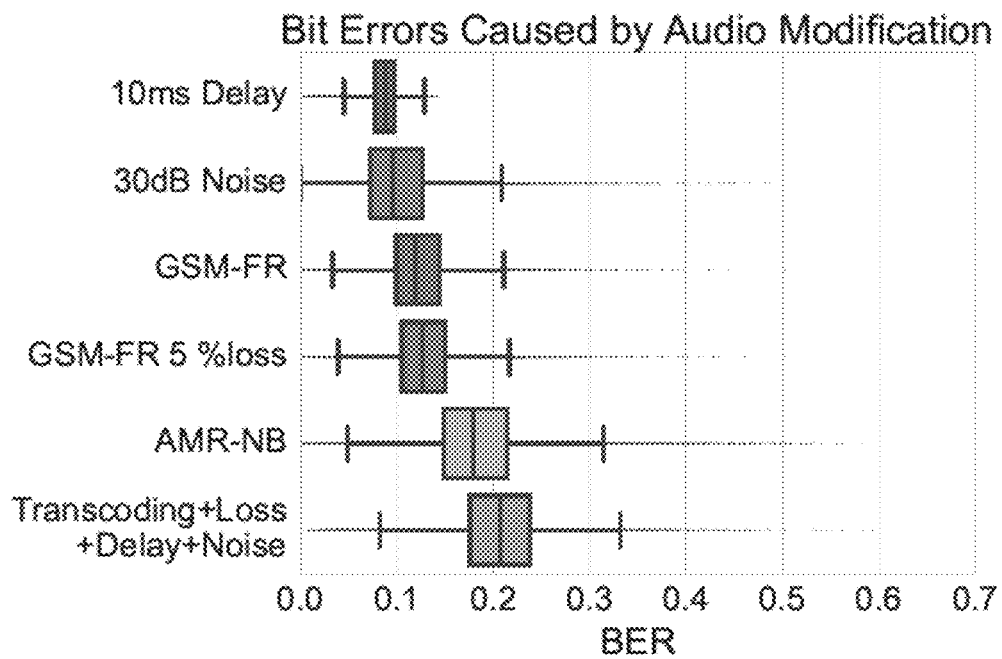
FIG. 7 is a box plot showing the distribution of digest bit error rates as a result of various audio degradations, which are well below the rates seen by adversarial audio as shown in FIG. 8.

FIG. 7 shows boxplots representing the distribution of BER rates of each type of degradation tested. All degradations show a fairly tight BER distribution near the median with a long tail. Of the effects tested, a 10 ms delay has the least effect, which is because the digest windows the audio with a high overlap. For most digests, addition of white noise also has little effect; this is because LSF analysis discards all frequency information except for the most important frequencies. Therefore, higher error rates caused by the use of audio codecs like GSM-FR and AMR-NB are seen as these codecs significantly alter the frequency content of the audio, and a 5% loss rate has negligible effect on the audio digests. Finally, combining transcoding, loss, delay, and noise has an additive effect on the resulting digest error. In other words, the more degradation that takes place, the higher the bit error. These experiments show that RSH is robust to common audio modifications.

While robustness is essential, the ultimate goal of these digests is to detect maliciously tampered or injected audio, which will be referred to as "adversarial audio." To validate the ability of RSH to detect adversarial audio, the BER of digests of every pair of seconds of TIMIT audio discussed was computed. This dataset includes 252,821,341 pairs of single seconds of audio. For this test, the same key for every hash was used, which models a situation where an adversary can cause the target to receive audio of its choice but not modify the associated digest.

Figure 8:
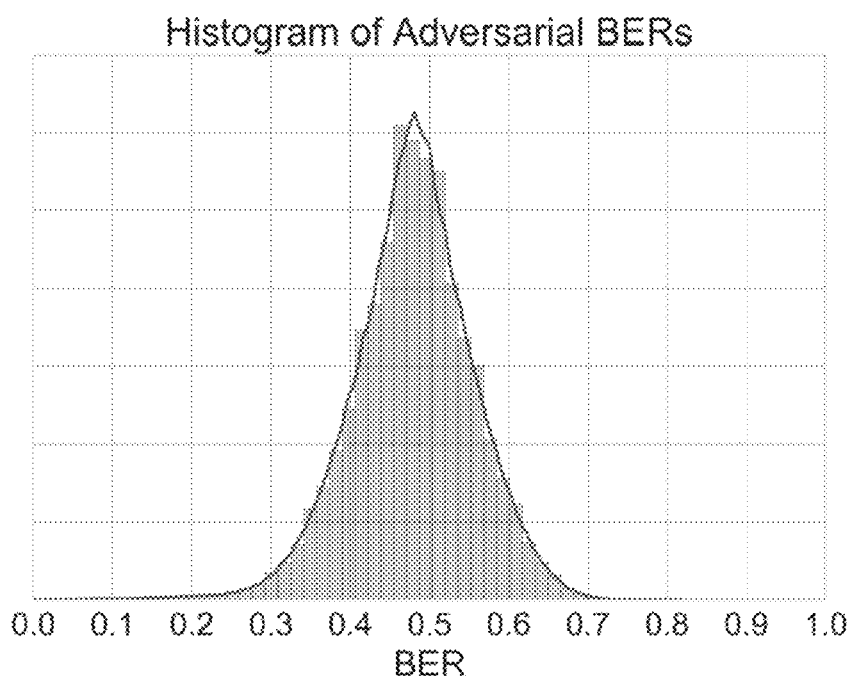
FIG. 8 shows a histogram and kernel density estimate of digests of adversarial audio on over 250 million pairs of 1-second speech samples. While the majority of legitimately modified audio has digest errors less than 35%, adversarial audio has digest BERs averaging 47.8%.

It was found that the mean BER between two distinct audio pairs is 0.478. A histogram and kernel density estimate of these values is shown in FIG. 8. This plot shows that the bit error is normally distributed with a mean and median of 0.478 and 0.480 (respectively). The expected bit error for two random bit strings is 50%, and the mean seen for RSH bit error is close to the optimal distance between two adversarial digests.

Because the TIMIT corpus contains speakers speaking several identical sentences, the resilience of the digest to more specific adversarial scenarios can be investigated in two important ways. First, it can be determined whether using different speech from the same speaker can create a false positive. If so, this would be a serious problem because an adversary could use recorded words from the target speaker undetected. Second, it can be determined whether a different speaker uttering the same words causes false positives. This test indicates to what extent the digest is protecting content instead of speaker characteristics. It was found that digests from the same speaker speaking different content are accepted at practically the same rate as audio that differs in speaker and content. At a BER detection threshold of 0.384, the detection rate for different content spoken by the same speaker was 0.901482, while the detection rate for different content spoken by a different speaker was 0.901215. However, identical phrases spoken by different speakers results in a much higher rate of collision and a detection rate of 0.680353. This lower detection rate is not a problem because it is still high enough to detect modified call audio with high probability. More importantly, it indicates that RSH is highly sensitive to changes in call content.

Figure 9:
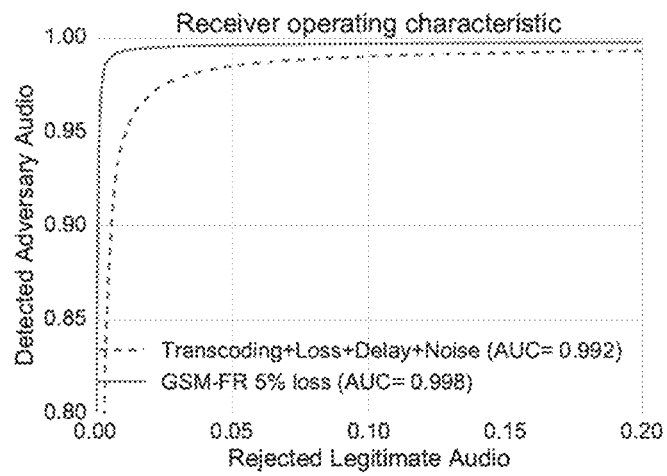
FIG. 9 is a digest performance ROC graph showing that digests can distinguish between legitimate and substituted audio, even in the presence of transcoding, loss, delay, and noise. These results are computed over digests of a single second. The graph is scaled to show the extreme upper corner.

Distinguishing legitimate and illegitimate audio requires choosing a BER threshold to detect tampered audio. Because the extreme values of these populations overlap, a tradeoff between detection and false positives must be made. The tradeoff is best depicted in the ROC curve of FIG. 9. This figure shows the true positive/false positive tradeoff measured on the adversarial audio and two legitimate modifications—GSM encoding and a combination of GSM, AMR-NB, 5% frame loss, 10 ms delay, and 30 dB of white noise. This combination represents an approximate "worst case" of legitimate audio. FIG. 9 shows excellent performance in terms of distinguishing audio. For GSM-only audio, there was an area-under-curve of 0.998, and for the "worst case" audio there was an area-under-curve of 0.992. However, because digests will be used at a high rate (one per second), even with a very small false positive rate, alerting users for every individual detection will likely result in warning fatigue. As a result, minimizing the user's likelihood of a false positive is an important consideration for determining a threshold. This problem suggests trading off sensitivity to short changes in call content for a lower false positive rate. To reduce overhead and network load, embodiments of the present invention can send digests in groups of five. To provide high detection rates while limiting false positives, embodiments of the present invention can alert the user if any 3 out of 5 digests are greater than the BER threshold. True and false performance of this scheme was modeled as a set of five Bernouli trials—successful authentication for true positives and successful digest collision for false positives. Thus, 3-out-of-5 performance can be computed using the binomial distribution.

After this analysis, an individual-digest BER threshold of 0.384 was selected. This corresponds to an individual adversary audio true positive detection rate of 0.90, while presenting a 0.0058 false positive rate against the "worst-case" audio and a 0.00089 false positive rate against clean GSM-FR encoded audio. Using the "three-out-of-five" alerting scheme, the probability of detecting 3 or more seconds of tampered audio is 0.992. The false positive rate is drastically reduced: the false positive rate is $1.96 \times 10^{-6}$, and for clean GSM-FR audio the false positive rate is $7.02 \times 10^{-9}$. This corresponds to a false alert on average every 425.1 hours of talk time as a worst case audio, and for GSM-FR audio one false positive every 118,766 hours. For reference, the average British mobile phone user only places 176 minutes per month of outbound calls. Assuming inbound and outbound talk time are roughly equal, the average user only places 70.4 hours of calls per year. This means that the average user would only see a false alert once every six years.

Audio digests of embodiments of the present invention have at least two purposes—to provide a guarantee that the voice call established was the one that was negotiated in the handshake and to ensure that the voice content has not significantly changed during the call. These two goals deal with adversaries of different capabilities. In particular, intercepting and modifying call audio requires far more advanced access and capability than simply spoofing a caller ID during a handshake already occurring. Audio digests can detect the first scenario within five seconds of audio, and will also quickly detect changes that affect any three seconds in five for the second scenario.

In limited circumstances, it may be possible for a man in-the-middle adversary to make small modifications to the received audio. For the second attack to be successful in the presence of these digests, a number of conditions must hold. First, the adversary can change no more than two seconds out of every five seconds of audio. Second, the adversary must change the audio in a way that would sound natural to the victim. This would mean that the changed audio would have to conform to the both the current sentence pattern as well as the speaker's voice. While voice modification algorithms exist, modifying an existing sentence in an ongoing conversation is likely beyond the abilities of current natural language processing. Finally, in addition to the substantial difficulty of these limits, the adversary must also do all of this in soft-real-time.

Nevertheless, a user is still not defenseless against such an attack. While it is believed such attempts would likely be noticeable and suspicious to the human ear, in embodiments of the present invention users can also receive prompts from when individual digests fail. These prompts can recommend that the user ask the opposing speaker to elaborate on their prior point or confirm other details to force the adversary to respond with enough tampered audio that the attack could be detected.

Example 2

Example 1 provided protocol design and characterized speech digests of embodiments of the present invention. In this Example, the implementation of an experimental embodiment of the present invention will be described and its performance evaluated.

The experimental embodiment included two main components—a server and client. The server used Akka 2.4.12 to instantiate an actor model in Java 1.7. MongoDB 3.2.10 was used to maintain a database of registered members (users of an embodiment of the present invention) and ongoing phone calls. Twilio's Call API was implemented to call clients during the registration phase to share the audio nonce that confirms control of a phone number. Additionally, Google Cloud Messaging (GCM) was used to generate a push notification to inform clients of incoming calls with minimal additional overhead. The experimental prototype of the embodiment the present invention also included a software implementation of a client for an Android device. Embodiments of the present invention can include an independent platform that is able to function across all telephony platforms, including smartphones, VoIP phones, and PBXs.

There are three parts of the application: the protocol, serialized messages, and audio digests. A TLS connection was used to establish a secure channel between client and server. TLS Certificates are generated using KeyTool and are packaged within the application. The experimental protocol of the embodiment of the present invention was implemented in Java using Spongy Castle, an Android version of the Bouncy Castle cryptography library. The protocol messages were serialized using Protocol Buffers allowing for smaller messages and improved transmission time. The audio digests were generated using code written in Matlab that was integrated into the application as part of an NDK library. In this example implementation, digest messages covered five seconds of audio (five individual digests).

RSA 4096 was used to generate public key primitives. For keyed hashes, SHA-3 was used for the underlying hash function for HMACs. In order to reduce handshake time, a standard set of NIST Diffie Hellman parameters were hardcoded into the client. These include the NIST 2048-bit MODP group with a 256-bit prime order subgroup from RFC5114. The experimental implementation reused the key derivation algorithm used by TLS 1.2, which is an HMAC-based Extract-and-Expand Key Derivation Function (HKDF) implemented according to IETF RFC 5869. Upon registration, the server issued the client an X509 Certificate. This consisted of a user's claimed identity, phone number, validity, public key and signature of the Certificate Authority. The certificates were signed using SHA-3 and RSA 4096.

An important system issue is that speech digests must be aligned to be computed over the same audio. In other words, there must be time synchronization. This is difficult to accomplish because audio delay from speaker to listener varies based on a number of network factors, so even high-accuracy synchronized clocks may fail to provide correct audio alignment. Embodiments of the present invention can solve this issue by beginning each call audio with a specific 1-second synchronization tone. This synchronization tone can be detected with a simple cross correlation computation and the performed experiments found the correct alignment within one millisecond.

The enrollment protocol sent a nonce through the voice channel to ensure that a client can receive a voice call. The experimental embodiments used a 128-bit random nonce. In this implementation, the nonce is encoded as DTMF tones. DTMF tones were used because they are faithfully transmitted through every telephone system and were simple to send and detect. There are 16 touch-tone digits, so each tone can represent an encoded hexadecimal digit. These tones are transmitted for 200 ms each with a 100 ms pause between tones. This provides a bit rate of 53.3 bits per second for a nonce transmission time of 9.6 seconds. This transmission time comprises the bulk of the time spent in the enrollment protocol.

Example 3

Using an experimental embodiment of the present invention, performance in enrollment and conducting call handshakes was measured and digests in real phone calls were compared. An experimental testbed was constructed. The server was placed on an Amazon Web Services (AWS) server located in Northern Virginia to model a realistic round trip time (RTT). The same network provider, AT&T, and the same cellular devices, Samsung Galaxy Note II N7100s, were used in all experiments. The enrollment and handshake experiments were carried out 20 times over both WiFi and 3G, and digest exchange tests were conducted 10 times using a WiFi data channel. Digest exchange was only done over WiFi as the experiment was used to compare content of the messages and not the delivery speed. In all experiments, voice was sent over a 3G voice channel while the protocol messages and data were sent over the selected data channel.

Figure 10:
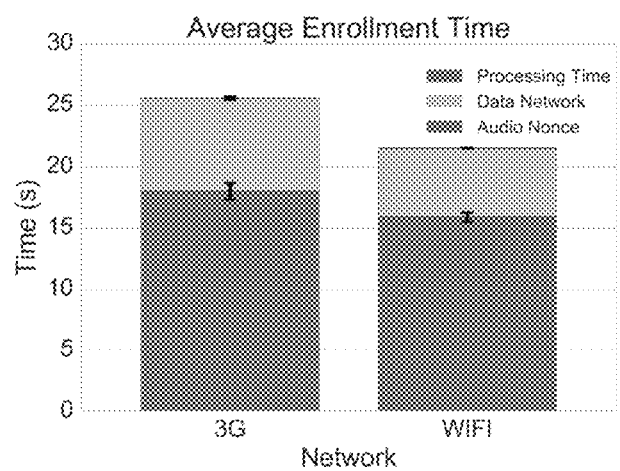
FIG. 10 is a graph showing average enrollment time. Enrollment takes less than 30 seconds and is a one-time process that can be done in the background.

The time taken to enroll users was measured. The time was measured from the instant a user begins enrollment to when the user receives the signed certificate in the last protocol message. This includes time taken to exchange protocol messages and to transmit and receive an audio nonce. For clients, enrollment can be a one-time process that is done before the first call is placed. It is analogous to activating a credit card with a bank, but requires no direct user input. FIG. 10 shows the average time of enrollment of an experimental embodiment of the present invention using 3G and WiFi networks' data channel to exchange protocol messages. The main contributor to the enrollment time comes from the transmission of the audio nonce that is used to establish ownership. Though the enrollment times over 3G and WiFi are 25 and 22 seconds, respectively, this can be done in the background without user interaction.

Figure 11:
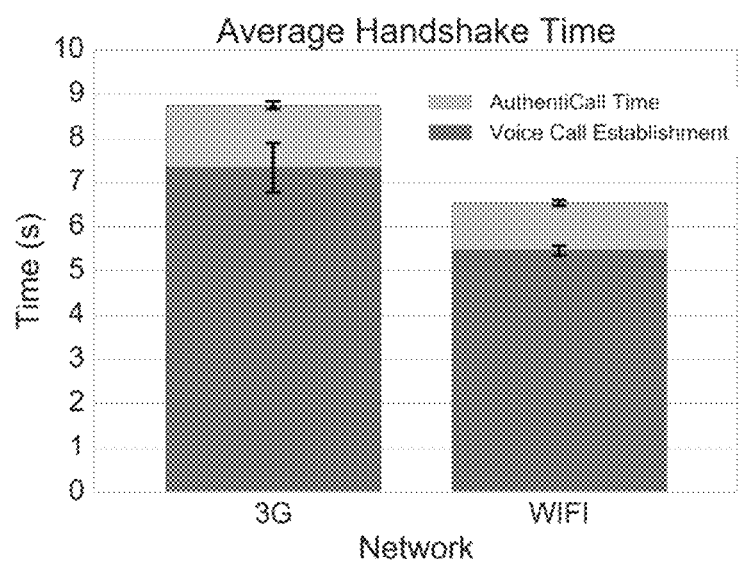
FIG. 11 is a graph of average handshake time. Embodiments of the present invention are shown adding 1 to 1.41 seconds to the phone call establishment. Note that this overhead is about the same as the standard error mean for 3G call establishment time. This makes the overhead effectively unnoticeable to users.

The time taken to complete an entire handshake on a single client was determined, including data messages and voice call set up time. Voice call set up time was substantial and required several seconds, even without call authentication. Possibly the most important performance metric is additional latency experienced by the end user. As shown in FIG. 11, the experimental prototype of the embodiment of the present invention only added 1.07 seconds for WiFi and 1.41 seconds on 3G data to the total call establishment time. This is likely to be unnoticeable to the user for several reasons. First, call establishment time varies significantly and this is normal network behavior, not an artifact introduced by the prototype. In the 3G experiments, the additional handshake time is approximately equal to the standard error in voice call establishment. Furthermore, the test phones were in the same location connected to the same tower, so the voice call setup time is likely lower than a typical call. This means that the time added to calls is likely far lower for typical calls. Finally, it should be noted that this is substantially faster than previous methods that take nearly ten seconds to perform authentication after call delivery.

Speech digest accuracy was evaluated over real call audio. In the 10 calls, 10 sentences were played from 10 randomly selected speakers in the TIMIT corpus through the call, and the prototype computed the sent and received digests. In total this represented 360 seconds of audio. For simplicity, a caller sends audio and digests, and a callee receives the audio and compares the received and locally computed digests (although this could potentially be done in reverse). Ten legitimate call digests were also compared with an "adversary call" setting containing different audio from the hashes sent by the legitimate caller. To compare the live call performance to simulated audio, individual-hash accuracy will be discussed first.

Figure 12:
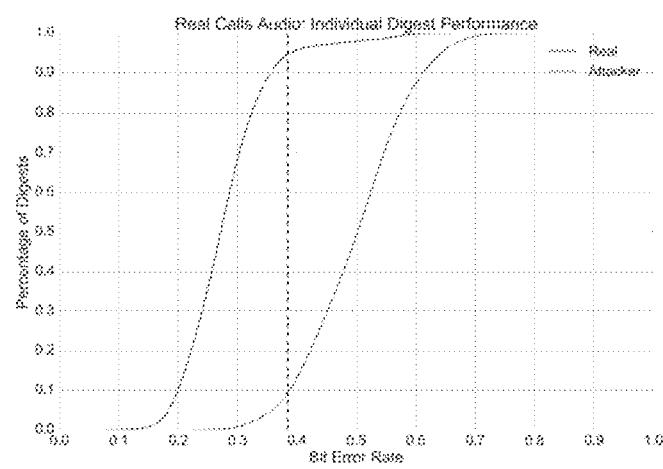
FIG. 12 is a graph showing individual digest performance. This figure shows that 93.4% of individual digests of adversarial audio are correctly detected while 95.5% of individual digests of legitimate audio are detected as authentic. Using a 3-out-of-5 detection scheme, 96.7% of adversarial audio is detected.

FIG. 12 shows the cumulative distribution of BER for digests of legitimate audio calls and audio sent by an adversary. The dotted line represents the previously established BER threshold of 0.348. In testing with adversarial audio, 93.4% of the fraudulent digests were detected as fraudulent. The simulation results showed an individual digest detection rate of 90%, meaning that real calls would see even greater performance. Using the 3-out-of-5 standard there was a 96.7% detection rate, demonstrating that embodiments of the present invention can effectively detect tampering in real calls.

Next, for legitimate calls, 95.5% of the digests were properly marked as authentic audio. Using the 3-out-of-5 standard, no five-second frames were marked as tampered. While the individual hash performance false positive rate of 4.5% was low, it was surprising to see that the performance differed from earlier evaluations on simulated degradations. Upon further investigation, it was found that the audio was being transmitted using the AMR-NB codec set to the lowest possible quality setting (4.75 kbps), which is typically used only when reception is exceptionally poor, and it is anticipated that this would be rare in deployment. Nevertheless, there are several mechanisms that can correct for this. The first option is to simply accept these individual false positives. Doing so would result in a false alert on average every 58 minutes, which is still acceptable as most phone calls last only 1.8 minutes. A second approach would be to modify detection thresholds if audio quality is poor to reduce the likelihood of a false positive. For example, moving to a 4-out-of-5 detection scheme would increase the expected time to false positive to 55.6 hours.

Figure 13:
FIG. 13 shows an experimental embodiment of the present invention detecting Caller ID fraud before a user answers the call.

FIG. 13 shows a dialer of an embodiment of the present invention that replaces the Android default dialer. When the callee receives a call, depending on the success of the handshake protocol, one of two screens is presented to the user. If the handshake is successful (i.e., the Caller ID was authenticated), FIG. 13(a) is shown. This screen shows a green lock signaling that the call is secure. The caller name that is registered with the server can also appear on the screen. On the other hand, if the handshake is unsuccessful (i.e., the Caller ID authentication fails), the screen from FIG. 13(b) will appear. As the call is insecure, the screen displays a danger message and a red "X" to warn the user.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] RedPhone::Private Calls—Android Apps on Google Play. https://play.google.com/store/apps/details?id=com.littlebytesofpi.linphonesip&hl=en.
[2] STU-III. http://cryptomuseum.com/crypto/usa/stu3/index.htm. (Accessed on Sep. 30, 2016).
[3] Average call. https://www.statista.com/statistics/185828/average-local-mobile-wireless-call-length-in-the-united-states-since-1987/, 2012.
[4] Sox. http://sox.sourceforge.net/Main/HomePage, 2013.
[5] Finally! No more annoying Robocalls and Telemarketers. http://www.nomorobo.com/, 2016.
[6] Landline phones are a dying breed. https://www.statista.com/chart/2072/landline-phones-in-the-united-states/, 2016.
[7] Letsencrypt. https://letsencrypt.org/, 2016.
[8] Robocall strike force report. Technical report, FCC, 2016. https://transition.fcc.gov/cgb/Robocall-Strike-Force-Final-Report.pdf.
[9] Spoofcard. http://www.spoofcard.com, 2016.
[10] Teen's iphone hack gets him arrested for unleashing ddos on 911 system. https://www.neowin.net/news/teens-iphone-hack-gets-him-arrested-for-unleashing-ddos-on-911-system, 2016.
[11] 3rd Generation Partnership Project. 3GPP TS 45.005 v12.1.0. Technical Report Radio transmission and reception. ftp://www.3gpp.org/tsg ran/TSG RAN/TSGR 17/Docs/PDF/RP-020661.pdf.
[12] F. Alegre, G. Soldi, and N. Evans. Evasion and obfuscation in automatic speaker verification. In Proceedings of the IEEE International Conference on Acoustics, Speech and Signal Processing (ICASSP), pages 749-753, 2014.
[13] S. Alfonsi. Hacking Your Phone. 60 Minutes—http://www.cbsnews.com/news/60-minutes-hacking-your-phone/, 2016.
[14] C. Amrutkar, P. Traynor, and P. van Oorschot. An Empirical Evaluation of Security Indicators in Mobile Web Browsers. IEEE Transactions on Mobile Computing (TMC), 14(5):889-903, 2015.

[15] V. Balasubramaniyan, A. Poonawalla, M. Ahamad, M. Hunter, and P. Traynor. PinDr0p: Using Single-Ended Audio Features to Determine Call Provenance. In Proceedings of the ACM Conference on Computer and Communications Security (CCS), 2010.

[16] V. A. Balasubramaniyan, A. Poonawalla, M. Ahamad, M. T. Hunter, and P. Traynor. PinDr0p: using single-ended audio features to determine call provenance. In Proceedings of the 17th ACM conference on Computer and communications security, pages 109-120. ACM, 2010.

[17] E. Barkan, E. Biham, and N. Keller. Instant Ciphertext-Only Cryptanalysis of GSM Encrypted Communication. Journal of Cryptology, 21(3):392-429, 2008.

[18] R. Baumann, S. Cavin, and S. Schmid. Voice Over IP-Security and SPIT. Swiss Army, FU Br, 41:1-34, 2006.

[19] B. Blanchet et al. An Efficient Cryptographic Protocol Verifier Based on Prolog Rules. 2014. https://people.mpi-sws.org/_dg/teaching/lis2014/modules/proverif-1-blanchet01.pdf.

[20] R. Bresciani, S. Superiore, S. Anna, and I. Pisa. The ZRTP Protocol Security Considerations. Technical Report LSV-07-20, 2007.

[21] B. Castle. Bouncy castle crypto apis. http://www.bouncycastle.org/.(Citedonpage82.), 2007.

[22] S. T. Chow, C. Gustave, and D. Vinokurov. Authenticating Displayed Names in Telephony. Bell Labs Technical Journal, 14(1):267-282, 2009.

[23] J. Clark and P. C. Van Oorschot. SoK: SSL and HTTPS: Revisiting past challenges and evaluating certificate trust model enhancements. In Proceedings of the IEEE Symposium on Security and Privacy (S&P), pages 511-525, 2013.

[24] A. Dabrowski, G. Petzl, and E. Weippl. The Messenger Shoots Back: Network Operator Based IMSI Catcher Detection. In 19th International Symposium on Research in Attacks, Intrusions and Defenses (RAID 2016), 2016.

[25] A. Dabrowski, N. Pianta, T. Klepp, M. Schmiedecker, and E. Weippl. IMSI-Catch Me If You Can: IMSI-Catcher-Catchers. In Annual Computer Security Applications Conference (ACSAC), 2014.

[26] I. Dacosta, M. Ahamad, and P. Traynor. Trust No One Else: Detecting MITM Attacks Against SSL/TLS Without Third-Parties. In Proceedings of the European Symposium on Research in Computer Security (ESORICS), 2012.

[27] I. Dacosta, V. Balasubramaniyan, M. Ahamad, and P. Traynor. Improving Authentication Performance of Distributed SIP Proxies. In Proceedings of the 3rd International Conference on Principles, Systems and Applications of IP Telecommunications. ACM, 2009.

[28] I. Dacosta and P. Traynor. Proxychain: Developing a Robust and Efficient Authentication Infrastructure for Carrier-Scale VoIP Networks. In USENIX Annual Technical Conference, 2010.

[29] R. Dantu, S. Fahmy, H. Schulzrinne, and J. Cangussu. Issues and challenges in securing VoIP. Computers & Security, 28(8):743-753, 2009.

[30] Datatracker. https://datatracker.ietf.org/wg/stir/charter/, 2016. [31] S. Egelman, L. F. Cranor, and J. Hong. You've been warned: An empirical study of the effectiveness of web browser phishing warnings. In Proceedings of the SIGCHI Conference on Human Factors in Computing Systems (CHI), 2008.

[32] C. Ellison and B. Schreier. Ten risks of PKI: What you're not being told about public key infrastructure. Computer Security Journal, 16(1):1-7, 2000.

[33] W. Enck, P. Traynor, P. McDaniel, and T. La Porta. Exploiting Open Functionality in SMS-Capable Cellular Networks. In Proceedings of the 12th ACM conference on Computer and communications security, pages 393-404. ACM, 2005.

[34] U. Equivox. Speaker recognition—Part 1. Biometric Technology Today, page 10, 2004.

[35] N. Evans, F. Alegre, Z. Wu, and T. Kinnunen. Anti-spoofing, Voice Conversion. Encyclopedia of Biometrics, pages 115-122, 2015.

[36] Federal Emergency Management Agency. Call Toll-Free Number For Disaster Assistance. https://www.fema.gov/news-release/2003/09/25/call-toll-free-number-disaster-assistance, 2003.

[37] J. S. Garofolo, L. F. Lamel, W. M. Fisher, J. G. Fiscus, and D. S. Pallett. Darpa timit acoustic-phonetic continous speech corpus cd-rom.nist speech disc 1-1.1. NASA STI/Recon technical report n, 93, 1993.

[38] S. Hicsonmez, H. T. Sencar, and I. Avcibas. Audio codec identification through payload sampling. Information Forensics and Security (WIFS), 2011 IEEE International Workshop on, pages 1-6, 2011.

[39] O. Hohlfeld, R. Geib, and G. HaBlinger. Packet loss in real-time services: Markovian models generating qoe impairments. In Quality of Service, 2008. IWQoS 2008. 16th International Workshop on, pages 239-248. IEEE, 2008.

[40] L. Huang, A. D. Joseph, B. Nelson, B. I. Rubinstein, and J. Tygar. Adversarial Machine Learning. In Proceedings of the ACM Workshop on Security and Artificial Intelligence, 2011.

[41] M. Huffman. Survey: 11% of adults lost money to a phone scam last year. Consumer Affairs—https://www.consumeraffairs.com/news/survey-11-of-adults-lost-money-to-a-phone-scam-last-year-012616.html, 2016.

[42] N. Jiang, Y. Jin, A. Skudlark, W.-L. Hsu, G. Jacobson, S. Prakasam, and Z.-L. Zhang. Isolating and analyzing fraud activities in a large cellular network via voice call graph analysis. In Proceedings of the $10^{th}$ international conference on Mobile systems, applications, and services (MobiSys), page 253, 2012.

[43] Y. Jiao, L. Ji, and X. Niu. Robust speech hashing for content authentication. IEEE Signal Processing Letters, 16(9):818-821, 2009.

[44] Q. Jin, A. R. Toth, A. W. Black, and T. Schultz. Is voice transformation a threat to speaker identification? In Proceedings of the International Conference on Acoustics, Speech and Signal Processing (ICASSP), pages 4845-4848, 2008.

[45] N. N. Katugampala, K. T. Al-Naimi, S. Villette, and A. M. Kondoz. Real-time end-to-end secure voice communications over GSM voice channel. Signal Processing Conference, 2005 13th European, pages 1-4, 2005.

[46] A. D. Keromytis. A comprehensive survey of voice over IP security research. IEEE Communications Surveys & Tutorials, 14(2):514-537, 2012.

[47] S. F. Khan, M. Portmann, and N. W. Bergmann. A Review of Methods for Preventing Spam in IP Telephony. Modern Applied Science, 7(7):48, 2013.

[48] T. Kinnunen, Z. Wu, K.-A. Lee, F. Sedlak, E. Cling, and H. Li. Vulnerability of speaker verification systems against voice conversion spoofing attacks: The case of telephone speech. In ICASSP, 2012.

[49] T. Kinnunen, Z.-Z. Wu, K. A. Lee, F. Sedlak, E. S. Chng, and H. Li. Vulnerability of speaker verification systems against voice conversion spoofing attacks: The case of telephone speech. In 2012 IEEE International Conference on Acoustics, Speech and Signal Processing (ICASSP), pages 4401-4404. IEEE, 2012.

[50] H. Krawczyk and P. Eronen. Hmac-based extract-and-expand key derivation function (hkdf). Technical report, 2010.

[51] P. P. Lee, T. Bu, and T. Woo. On the detection of signaling dos attacks on 3 g/wimax wireless networks. Computer Networks, 53(15):2601-2616, 2009.

[52] M. Lepinski and S. Kent. Additional diffie-hellman groups for use with ietf standards. RFC 5114, RFC Editor, January 2008.

[53] C.-Y. Li, G.-H. Tu, C. Peng, Z. Yuan, Y. Li, S. Lu, and X. Wang. Insecurity of Voice Solution VoLTE in LTE Mobile Networks. In Proceedings of the 22Nd ACM SIGSAC Conference on Computer and Communications Security, CCS '15, pages 316-327, New York, N.Y., USA, 2015. ACM.

[54] T. H. A. C. Liath and R. Bresciani. The ZRTP Protocol Analysis on the Diffie-Hellman Mode. Foundations and Methods Research Group, 2009.

[55] J. Lindqvist and M. Komu. Cure for Spam over Internet Telephony. In 4TH IEEE Consumer Communications And Networking Conference (CCNC 2007), pages 896-900, 2007.

[56] B. Mathieu, S. Niccolini, and D. Sisalem. SDRS: A Voice-over-IP Spam Detection and Reaction System. IEEE Security & Privacy Magazine, 6(6):52-59, nov 2008.

[57] H. Mustafa, W. Xu, A. R. Sadeghi, and S. Schulz. You Can Call but You Can't Hide: Detecting Caller ID Spoofing Attacks. In 2014 44th Annual IEEE/IFIP International Conference on Dependable Systems and Networks, pages 168-179, 2014.

[58] S. Mustafa, H. and Wenyuan Xu and Sadeghi, A. R. and Schulz. You can SPIT, but you can't hide: Spammer identification in telephony networks. In 2011 Proceedings IEEE INFOCOM, pages 41-45, 2011.

[59] G. Ormazabal, S. Nagpal, E. Yardeni, and H. Schulzrinne. Secure SIP: A scalable prevention mechanism for DOS attacks on SIP based VoIP systems. In Principles, systems and applications of IP telecommunications. Services and security for next generation networks, pages 107-132. Springer, 2008.

[60] M. A. Ozkan, B. Ors, and G. Saldamli. Secure voice communication via GSM network. 2011 7th International Conference on Electrical and Electronics Engineering (ELECO), pages II-288-II-292, 2011.

[61] N. Papernot, P. McDaniel, M. F. Somesh Jha, Z. B. Celik, and A. Swami. The Limitations of Deep Learning in Adversarial Settings. In Proceedings of the 1st IEEE European Symposium on Security and Privacy (Euro S&P), 2016.

[62] N. Papernot, P. McDaniel, X. Wu, S. Jha, and A. Swam. Distillation as a Defense to Adversarial Perturbations against Deep Neural Networks. In Proceedings of the IEEE Symposium on Security and Privacy (S&P), 2016.

[63] M. Pemble. Crying 'Havoc', Crying 'Wolf' or Just Howling at the Moon? Network Security, 2001(9):14-16, 2001.

[64] M. Petraschek, T. Hoeher, O. Jung, H. Hlavacs, and W. Gansterer. Security and usability aspects of Man-in-the-Middle attacks on ZRTP. Journal of Universal Computer Science, (5):673-692.

[65] S. Phithakkitnukoon and R. Dantu. Defense against SPIT using community signals. Intelligence and Security Informatics, 2009. ISI '09. IEEE International Conference on, 2009.

[66] R. Pries, T. HoBfeld, and P. Tran-Gia. On the suitability of the short message service for emergency warning systems. In 2006 IEEE 63rd Vehicular Technology Conference, volume 2, pages 991-995. IEEE, 2006.

[67] V. M. Quinten, R. Van De Meent, and A. Pras. Analysis of techniques for protection against spam over internet telephony. In Meeting of the European Network of Universities and Companies in Information and Communication Engineering, pages 70-77. Springer, 2007.

[68] A. Ramirez. Theft through cellular 'clone' calls. http://www.nytimes.com/1992/04/07/business/theft-through-cellular-clone-calls.html, Apr. 7, 1992.

[69] B. Reaves, L. Blue, and P. Traynor. Authloop: End-to-end cryptographic authentication for telephony over voice channels. 25th USENIX Security Symposium (USENIX Security 16), pages 963-978, August 2016.

[70] B. Reaves, E. Shernan, A. Bates, H. Carter, and P. Traynor. Boxed out: blocking cellular interconnect bypass fraud at the network edge. In 24th USENIX Security Symposium (USENIX Security 15), pages 833-848, 2015.

[71] S. Rosset, U. Murad, E. Neumann, Y. Idan, and G. Pinkas. Discovery of Fraud Rules for Telecommunications-Challenges and Solutions. In Proceedings of the Fifth ACM SIGKDD International Conference on Knowledge Discovery and Data Mining (KDD), pages 409-413, New York, N.Y., USA, 1999.

[72] U. R"uhrmair, S. Katzenbeisser, M. Steinebach, and S. Zmudzinski. Watermark-Based authentication and key exchange in teleconferencing systems. In IFIP International Conference on Communications and Multimedia Security, pages 75-80. Springer, 2010.

[73] S. E. Schechter, R. Dhamija, A. Ozment, and I. Fischer. The emperor's new security indicators. In Proceedings of the IEEE Symposium on Security and Privacy (S&P), 2007.

[74] H. Sengar. VoIP Fraud: Identifying a Wolf in Sheep's Clothing. In Proceedings of the 2014 ACM SIGSAC Conference on Computer and Communications Security, pages 334-345. ACM, 2014.

[75] J. Senor, H. Zang, and J. C. Bolot. Impact of paging channel overloads or attacks on a cellular network. 2006.

[76] M. Sherr, E. Cronin, S. Clark, and M. Blaze. Signaling Vulnerabilities in Wiretapping Systems. IEEE Security & Privacy Magazine, 3(6):13-25, November 2005.

[77] M. Shirvanian and N. Saxena. Wiretapping via Mimicry: Short Voice Imitation Man-in-the-Middle Attacks on Crypto Phones. In Proceedings of the 2014 ACM SIGSAC Conference on Computer and Communications Security (CCS), pages 868-879, 2014.

[78] M. Shirvanian and N. Saxena. On the Security and Usability of Crypto Phones. In Proceedings of the 31st Annual Computer Security Applications Conference, pages 21-30, 2015.

[79] M. Simon and J. Slay. Voice over IP: Forensic computing implications. 2006.

[80] Statista. https://www.statista.com/statistics/273902/average-monthly-outbound-mobile-voice-minutes-per-person-in-the-uk/, 2013.

[81] Y. Stylianou. Voice transformation: a survey. In 2009 IEEE International Conference on Acoustics, Speech and Signal Processing, pages 3585-3588. IEEE, 2009.

[82] O. Tange et al. Gnu parallel-the command-line power tool.

[83] TrapCall. https://www.trapcall.com/, 2016.
[84] P. Traynor, P. McDaniel, and T. La Porta. Security for Telecommunications Networks. Number 978-0-387-72441-6 in Advances in Information Security Series. Springer, August 2008.
[85] G.-H. Tu, C.-Y. Li, C. Peng, Y. Li, and S. Lu. New Security Threats Caused by IMS-based SMS Service in 4 g LTE Networks. In Proceedings of the 2016 ACM SIGSAC Conference on Computer and Communications Security, CCS '16, pages 1118-1130, New York, N.Y., USA, 2016. ACM.
[86] H. Tu, A. Doup'e, Z. Zhao, and G.-J. Ahn. SoK: Everyone Hates Robocalls: A Survey of Techniques against Telephone Spam. 2016 IEEE Symposium on Security and Privacy (S&P), 2016.
[87] Vassilis Prevelakis and Diomidis Spinellis. The Athens Affair. IEEE Spectrum, June 2007.
[88] X. Wang and R. Zhang. VoIP Security: Vulnerabilities, Exploits and Defenses. In Elsevier's book series Advances in Computers, March 2011:1-49.
[89] A. Whitten and J. D. Tygar. Why Johnny Can't Encrypt: A Usability Evaluation of PGP 5.0. 1999.
[90] Z. Wu, C. E. Siong, and H. Li. Detecting Converted Speech and Natural Speech for anti-Spoofing Attack in Speaker Recognition. In INTERSPEECH, pages 1700-1703, 2012.
[91] P. Zimmermann, A. Johnston, and J. Callas. RFC 6189 ZRTP: Media Path Key Agreement for Unicast Secure RTP. Internet Engineering Task Force, 2011.
[92] P. R. Zimmermann. The Zfone™ Project. Zfone Project Home Page-http://zfoneproject.com/, 2016.

What is claimed is:

1. A method for call authentication comprising:
an enrollment protocol that ensures a user controls a number the user claims to own;
a handshake protocol that mutually authenticates two calling parties comprising a caller and a callee; and
a call integrity protocol that ensures the security of a voice channel and a content it carries, wherein the call integrity protocol comprises:
sending a message indicating that a voice call is connected, wherein the message comprises a timestamp and a hash message authentication code (HMAC) of the timestamp by the caller and the callee;
sending other audio digests by the caller and the callee after the voice call begins; and
sending a call concluded message comprising a timestamp with an HMAC.

2. The method according to claim 1, wherein a server acts as either an endpoint or intermediary between user clients.

3. The method according to claim 1, wherein all of the protocols implement end-to-end cryptography.

4. The method according to claim 1, wherein the enrollment protocol issues a certificate that binds an identity of the client to a phone number.

5. The method according to claim 4, wherein the enrollment protocol comprises:
establishing a client C and an enrollment server S;
(message 1) C sending an enrollment request with S's identity, C's identity information, C's phone number, and C's public key;
(message 2) S sending a nonce $N_{Net}$, the identities of C and S and the phone numbers of C and S with a timestamp to ensure freshness, liveness, and to provide a "token" for the particular authentication session;
(message 3) S confirming that C controls the phone number it claims by S placing a call to C's claimed phone number, and S transmitting a nonce $N_{Audio}$ over the voice channel when a call is answered;
(message 4) C sending both the nonce $N_{Net}$ and the nonce $N_{Audio}$ along with the IDs of server, client, a timestamp, and a signature covering all other fields; and
(message 5) S replying with a signed certificate issued to C.

6. The method according to claim 5, wherein the enrollment protocol comprises an out-of-band process for verifying identity of certificates (particularly high-value certificates), authentication of supporting documentation, and/or CNAM3 lookups.

7. The method according to claim 1, wherein the handshake protocol comprises a first phase indicating to a server and the two calling parties that a call is imminent and a second phase of authenticating both parties on the call and establishing shared secrets.

8. The method according to claim 1, wherein the other audio digests are transmitted for a duration of the voice call and are authenticated with HMACs.

9. A method of authentication, comprising:
performing an enrollment protocol between a client and a server to ensure that a user controls a phone number and to issue a certificate to the user;
performing a handshake protocol between two calling parties comprising a caller and a callee through the server to authenticate the two calling parties; and
performing a call integrity protocol to ensure security of a voice channel and a content it carries, wherein the call integrity protocol comprises:
sending a message indicating that a voice call is connected, wherein the message comprises a timestamp and a hash message authentication code (HMAC) of the timestamp by the caller and the callee;
sending other audio digests by the caller and the callee after the voice call begins; and
sending a call concluded message comprising a timestamp with an HMAC.

10. The method according to claim 9, wherein the certificate the enrollment protocol binds an identity of the client to the phone number.

11. The method according to claim 10, wherein the identity comprises at least one of a name, an organization, and pertinent information.

12. The method according to claim 11, wherein the enrollment protocol comprises:
sending an enrollment request with the server's identity, the client's identity, the client's phone number, and the client's public key by the client;
sending a nonce $N_{Net}$, the identities of the client and the server, and the phone numbers of the client and the server with a timestamp by the server;
sending the nonce $N_{Net}$ and an audio nonce $N_{Audio}$ by the client; and
replying with a signed certificate issued to the client by the server.

13. The method according to claim 12, wherein the server provides a token during sending the nonce $N_{Net}$.

14. The method according to claim 9, wherein the handshake protocol comprises a first phase indicating imminent call between the server and the calling parties, and a second phase authenticating the calling parties.

15. The method according to claim 14, wherein the first phase comprises:
indicating by the caller to the server that the caller wants to place a call;

informing by the server to the callee that an authenticated voice call is coming; and informing by the server to the caller whether the callee is using the authenticated voice call.

16. The method according to claim 15, wherein the caller and the callee compute independently messages and send the messages in parallel during the second phase of the handshake protocol.

17. The method according to claim 16, wherein the messages contain all information necessary for a Diffie-Hellman Key establishment authenticated with a signature key in a certificate of the caller and the callee.

18. The method according to claim 9, wherein the call integrity protocol confirms that the voice channel is established and confirms when a call ends.

19. A method of authentication, comprising:

performing an enrollment protocol between a client and a server to ensure that a user controls a phone number and to issue a certificate to the user;

performing a handshake protocol between two calling parties comprising a caller and a callee through the server to authenticate the two calling parties; and performing a call integrity protocol to ensure security of a voice channel and a content it carries, wherein the enrollment protocol comprises:

sending an enrollment request with the server's identity, the client's identity information, the client's phone number, and the client's public key by the client;

sending a nonce $N_{Net}$, the identities of the client and the server, and the phone numbers of the client and the server with a timestamp by the server;

sending the nonce $N_{Net}$ and an audio nonce $N_{Audio}$ by the client; and replying with a signed certificate issued to the client by the server, wherein the handshake protocol comprises:

indicating by the caller to the server that the caller wants to place a call;

informing by the server to the callee that an authenticated voice call is coming; and informing by the server to the caller whether the callee is using the authenticated voice call, and wherein the call integrity protocol comprises:

sending a message indicating that a voice call is connected, wherein the message comprises a timestamp and a hash message authentication code (HMAC) of the timestamp by the caller and the callee;

sending other audio digests by the caller and the callee after the voice call begins; and sending a call concluded message comprising a timestamp with an HMAC.

* * * * *